United States Patent
Sumioka et al.

(10) Patent No.: US 8,411,836 B2
(45) Date of Patent: Apr. 2, 2013

(54) FORWARDING APPARATUS, TELEPHONE SERVER, FORWARDING METHOD, AND FORWARDING SYSTEM

(75) Inventors: Motoshi Sumioka, Kawasaki (JP); Masahiko Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 332 days.

(21) Appl. No.: 12/729,789

(22) Filed: Mar. 23, 2010

(65) Prior Publication Data

US 2010/0246796 A1    Sep. 30, 2010

(30) Foreign Application Priority Data

Mar. 27, 2009   (JP) ................. 2009-080396

(51) Int. Cl.
*H04M 3/42* (2006.01)

(52) U.S. Cl. ......... 379/211.01; 379/211.02; 379/221.01; 379/212.01; 455/418; 455/435.1; 455/414.1

(58) Field of Classification Search ............ 379/211.01, 379/212.02; 455/418, 466, 435.1, 414.1, 455/417; 709/201, 212, 206
See application file for complete search history.

(56) References Cited

U.S. PATENT DOCUMENTS

| | | | |
|---|---|---|---|
| 5,590,178 | A | 12/1996 | Murakami et al. |
| 5,864,670 | A | 1/1999 | Hayashi et al. |
| 6,421,536 | B1 | 7/2002 | Uranaka et al. |
| 2003/0018695 | A1 | 1/2003 | Kagaya et al. |
| 2006/0256790 | A1 | 11/2006 | Kondou et al. |
| 2007/0136432 | A1 | 6/2007 | Murakami et al. |
| 2007/0263613 | A1 | 11/2007 | Hara et al. |
| 2007/0288566 | A1 | 12/2007 | Murakami et al. |
| 2009/0111441 | A1* | 4/2009 | Monaco et al. ................ 455/415 |
| 2009/0132632 | A1* | 5/2009 | Jackson et al. ................ 709/201 |
| 2009/0207990 | A1* | 8/2009 | Wada ....................... 379/212.01 |
| 2010/0093381 | A1* | 4/2010 | Maguire ....................... 455/466 |

FOREIGN PATENT DOCUMENTS

| | | |
|---|---|---|
| JP | 7-99508 | 4/1995 |
| JP | 8-97814 | 4/1996 |
| JP | 9-64982 | 3/1997 |
| JP | 2000-174925 | 6/2000 |
| JP | 2001-292226 | 10/2001 |
| JP | 2002-215491 | 8/2002 |
| JP | 2002-330234 | 11/2002 |
| JP | 2004-502347 | 1/2004 |
| JP | 2006-309604 | 11/2006 |
| JP | 2006-319697 | 11/2006 |
| JP | 2007-166018 | 6/2007 |
| JP | 2007-312345 | 11/2007 |
| JP | 2007-329754 | 12/2007 |
| WO | 02/01828 A1 | 1/2002 |
| WO | 2008/146397 A1 | 12/2008 |

* cited by examiner

*Primary Examiner* — Joseph J Nguyen
(74) *Attorney, Agent, or Firm* — Staas & Halsey LLP

(57) ABSTRACT

A forwarding apparatus includes: a transmission source acquisition part for acquiring a first telephone number of a telephone corresponding to a transmission source of digital information; a call destination receiving part for receiving, from the telephone server, a second telephone number of a telephone called through the telephone number acquired by the transmission source acquisition part; a forwarding destination identifying part for identifying a forwarding destination corresponding to a telephone having the second telephone number received by the call destination receiving part; and a forwarding part for forwarding the digital information to the forwarding destination identified by the forwarding destination identifying part.

13 Claims, 29 Drawing Sheets

FIG. 5

| USER NAME | TELEPHONE NUMBER | MAIL ADDRESS |
|---|---|---|
| STAFF MEMBER A | 1111-0001 | a@jp.xxx.com |
| STAFF MEMBER B | 1111-0002 | b@lab.xxx.com |
| STAFF MEMBER C | 1111-0003 | c@lab.xxx.com |
| ⋮ | ⋮ | ⋮ |

FIG. 6A

| From | a@jp.xxx.com |
| --- | --- |
| To | reg@mail.xxx.com |
| Cc | |
| ATTACHED FILE | |
| SUBJECT | |

1111-0001

[TRANSMIT] [CANCEL]

FIG. 6B

| From | Reg-200902061015@mail.xxx.com |
| --- | --- |
| To | a@jp.xxx.com |
| Cc | |
| ATTACHED FILE | |
| SUBJECT | REGISTRATION FOR PARTICIPATION | a@jp.xxx.com HAS APPLIED FOR REGISTRATION ON ADDRESS BOOK. REPLY IF APPLIED BY AUTHORIZED PERSON.

[TRANSMIT] [CANCEL]

FIG. 7

| From | a@jp.xxx.com |
| --- | --- |
| To | tel@mail.xxx.com |
| Cc | |
| ATTACHED FILE | siryou.pdf |
| SUBJECT | MATTER DISCUSSED OVER PHONE |

SEE P3 FOR DETAIL

TRANSMIT    CANCEL

FIG. 8A

```
From:      reply@mail.xxx.com
To:        a@jp.xxx.com
SUBJECT:   ERROR NOTIFICATION
MESSAGE:
MAIL FORWARDING IS ABORTED.
YOUR INFORMATION IS NOT REGISTERED.

TRANSMISSION MAIL:
From            a@jp.xxx.com
To              tel@mail.xxx.com
ATTACHED FILE   siryou.pdf
SUBJECT         MATTER DISCUSSED OVER PHONE
MESSAGE
SEE P3 FOR DETAIL
```

FIG. 8B

```
From:      reply@mail.xxx.com
To:        a@jp.xxx.com
SUBJECT:   ERROR NOTIFICATION
MESSAGE:
MAIL FORWARDING IS ABORTED.
DESTINATION, STAFF MEMBER A IS NOW ON, IS NOT FOUND.

TRANSMISSION MAIL:
From            a@jp.xxx.com
To              tel@mail.xxx.com
ATTACHED FILE   siryou.pdf
SUBJECT         MATTER DISCUSSED OVER PHONE
MESSAGE
SEE P3 FOR DETAIL
```

FIG. 9A

```
From:      reply@mail.xxx.com
To:        a@jp.xxx.com
SUBJECT:   ERROR NOTIFICATION
MESSAGE:
MAIL FORWARDING IS ABORTED.
DESTINATION 1111-0002, STAFF MEMBER A IS NOW ON,
IS NOT REGISTERED.

TRANSMISSION MAIL:
From           a@jp.xxx.com
To             tel@mail.xxx.com
ATTACHED FILE  siryou.pdf
SUBJECT        MATTER DISCUSSED OVER PHONE
MESSAGE
SEE P3 FOR DETAIL
```

FIG. 9B

```
From:      reply@mail.xxx.com
To:        a@jp.xxx.com
SUBJECT:   FORWARDING REPORTING
MESSAGE:
MAIL FROM STAFF MEMBER A ON LINE 1111-0001
IS FORWARDED TO STAFF MEMBER B ON LINE 1111-0002.

TRANSMISSION MAIL:
From           a@jp.xxx.com
To             tel@mail.xxx.com
ATTACHED FILE  siryou.pdf
SUBJECT        MATTER DISCUSSED OVER PHONE
MESSAGE
SEE P3 FOR DETAIL
```

FIG. 10

From: reply@mail.xxx.com
To: b@lab.xxx.com
SUBJECT: TALK WITH STAFF MEMBER B (2008.11.25 18:02)
ATTACHED FILE: siryou.pdf
MESSAGE:
TO STAFF MEMBER B, MARKETING DEPARTMENT
MAIL REGARDING CONTENT OF TALK ON DECEMBER 25, 2008,18:02 IS SENT. SENDER IS STAFF MEMBER A, ADMINISTRATIVE DEPARTMENT (TELEPHONE: 1111-0001)

COMMENT OF STAFF MEMBER A:
SEE P3 FOR DETAIL

FIG. 16

| USER NAME | TELEPHONE NUMBER | MAIL ADDRESS | FILE PATH |
|---|---|---|---|
| STAFF MEMBER A | 1111-0001 | a@jp.xxx.com | ¥¥SERVER A¥STAFF MEMBER A¥BUSY PUBLIC FOLDER |
| STAFF MEMBER B | 1111-0002 | b@lab.xxx.com | ¥¥SERVER B¥STAFF MEMBER B¥BUSY PUBLIC FOLDER |
| STAFF MEMBER C | 1111-0003 | c@lab.xxx.com | ¥¥SERVER B¥STAFF MEMBER C¥BUSY PUBLIC FOLDER |
| ... | ... | ... | ... |

FIG. 19

| USER NAME | TELEPHONE NUMBER | FILE PATH |
|---|---|---|
| STAFF MEMBER A | 1111-0001 | ¥¥SERVER A¥STAFF MEMBER A¥BUSY PUBLIC FOLDER |
| STAFF MEMBER B | 1111-0002 | ¥¥SERVER B¥STAFF MEMBER B¥BUSY PUBLIC FOLDER |
| STAFF MEMBER C | 1111-0003 | ¥¥SERVER B¥STAFF MEMBER C¥BUSY PUBLIC FOLDER |
| ... | ... | ... |

FIG. 23

```
From:       reply@mail.xxx.com
To:         a@jp.xxx.com
SUBJECT:    FORWARDING CONFIRMATION
MESSAGE:
TRANSMISSION OF MAIL FROM
STAFF MEMBER A ON LINE 1111-0001 TO
STAFF MEMBER B ON LINE 1111-0002 ACCEPTABLE?

TRANSMISSION MAIL:
From            a@jp.xxx.com
To              tel@mai.xxx.com
ATTACHED MAIL   siryou.pdf
SUBJECT   MATTER DISCUSSED OVER PHONE
MESSAGE
SEE P3 FOR DETAIL
```

FIG. 28

| TELEPHONE NUMBER | RELATED NUMBER |
|---|---|
| 1119-0009 | 1112-0002 |
|  | 1113-0003 |

FORWARDING APPARATUS, TELEPHONE SERVER, FORWARDING METHOD, AND FORWARDING SYSTEM

CROSS-REFERENCE TO RELATED APPLICATIONS

This application is based upon and claims the benefit of priority of the prior Japanese Patent Application No. 2009-80396, filed on Mar. 27, 2009, the entire contents of which are incorporated herein by reference.

FIELD

The present invention relates to a forwarding apparatus, a telephone server, a forwarding method, and a forwarding system for forwarding digital information from a call source to a call destination.

BACKGROUND

Telephones are widely used for business and private purposes. At the end of each telephone call, materials such as a document, an image, etc. related to a subject of the call may be transmitted to a call partner. Also in the middle of the call, the materials may be exchanged between the caller and the called person and they converse with each other while viewing the exchanged material. The materials are typically digital data. An electronic mail including such digital information is often directly transmitted from a call source to a call destination. In such a case, mail addresses need to be exchanged between the call source and the call destination. This operation is a troublesome. If the call source acquires the mail address of the call destination, there is a possibility that digital information unrelated to the call, such as junk mail, is transmitted to the mail address of the call destination.

The use of private information, such as an email address, other than the telephone, inconveniences the call source and the call destination. Japanese Laid-open Patent Publication Nos. 2007-166018 and 2000-174925 discuss methods of transmitting digital information to a call destination only in the middle of a call using a receiver such as a file server, a data communication device, or the like without using the private information such as a mail address. If the file server is used, a folder permitting the call source and the call destination to access thereto is generated in order to transmit the digital information. In the case of the data communication device, the call source and the call destination are connected to a data communication device operated during the call in order to transmit the digital information.

SUMMARY

According to an aspect of the invention, a forwarding apparatus includes: a transmission source acquisition part for acquiring a first telephone number of a telephone corresponding to a transmission source of digital information; a call destination receiving part for receiving, from the telephone server, a second telephone number of a telephone called through the telephone number acquired by the transmission source acquisition part; a forwarding destination identifying part for identifying a forwarding destination corresponding to a telephone having the telephone number received by the call destination receiving part; and a forwarding part for forwarding the digital information to the forwarding destination identified by the forwarding destination identifying part.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 illustrates a record layout of a telephone number database.
FIGS. 6A and 6B illustrate mail transmission screens.
FIG. 7 illustrates a mail transmission screen.
FIGS. 8A and 8B illustrate an error mail.
FIGS. 9A and 9B illustrate an error mail and a reporting mail, respectively.
FIG. 10 illustrates a forwarded mail.
FIG. 16 illustrates a record layout of a telephone number database.
FIG. 19 illustrates a record layout of the telephone number database.
FIG. 23 illustrates a forwarding confirmation mail.
FIG. 28 illustrates a record layout of a related number database.

DESCRIPTION OF EMBODIMENTS

Figure 1:
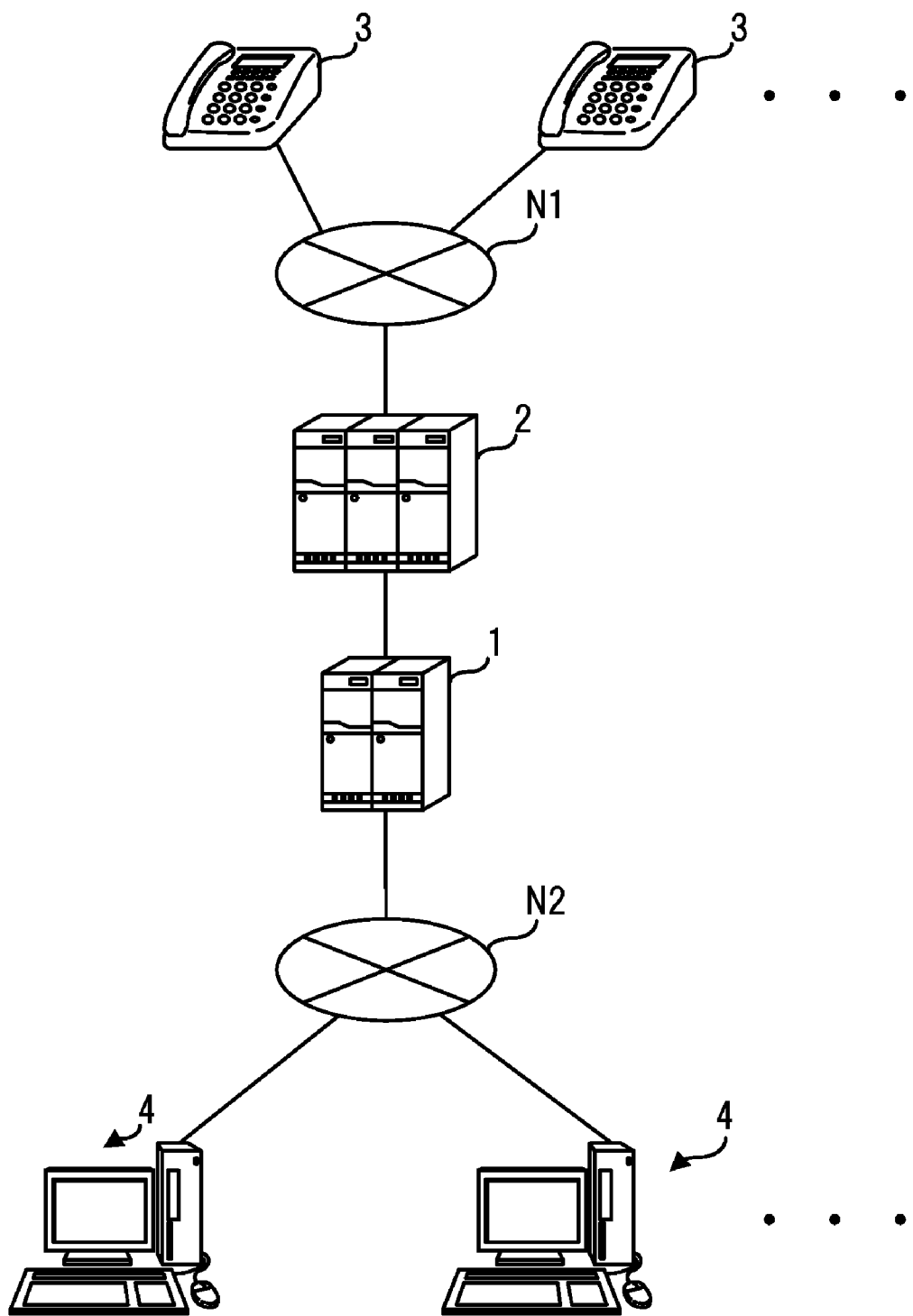
FIG. 1 is a configuration diagram of a forwarding system.

In accordance with the technique disclosed in Japanese Laid-open Patent Publication No. 2007-166018, the receiver device is operated with the call destination being operative to receive the digital information. If the call destination has no receiver device operative during the call, the digital information may not be sent to the call destination. In accordance with the technique disclosed in Japanese Laid-open Patent Publication No. 2000-174925, a terminal connected to a special status notification device is needed. A typical terminal having standard functions such as a file sharing function and an electronic mailing function has difficulty with transmitting the digital information.

In view of the above problems, a technique has been developed. It is an object of the technique to provide a forwarding apparatus with which a call source transmits digital information to a call destination without inputting private information identifying the call destination of the digital information, using a terminal having standard functions such as a file sharing function and an electronic mailing function. A forwarding destination corresponding to the call destination is identified and the digital information is transmitted to the forwarding destination even if the call destination in operation has no operable terminal.

A forwarding apparatus disclosed herein communicates with a telephone server connected via a telephone line to a plurality of telephones. The forwarding apparatus includes a transmission source acquisition part for acquiring a telephone number of a telephone corresponding to a transmission source of digital information, a call destination receiving part for receiving, from the telephone server, a telephone number of a telephone called through the telephone number acquired by the transmission source acquisition part, a forwarding destination identifying part for identifying a forwarding destination corresponding to a telephone having the telephone number received by the call destination receiving part, and a forwarding part for forwarding the digital information to the forwarding destination identified by the forwarding destination identifying part.

The forwarding apparatus receives the digital information from the call source, and forwards the digital information to the forwarding destination corresponding to the call destination. The forwarding apparatus frees the call source from acquiring and inputting information identifying the forwarding destination. Even if the call destination in operation has no operable receiver device, the call source may transmit the digital information the call Destination using a typical terminal having standard functions such as a file sharing function and an electronic mailing function.

First Embodiment

The embodiments are specifically described with reference to the drawings. A forwarding system disclosed in this specification is typically used to transmit digital information such as a document file related to a telephone conversation made between, for example, departments in a corporation from a call source to a call destination. The forwarding system including a telephone server controlling in-house telephone calls may be installed inside the corporation. The forwarding system may include a telephone server connected to a public telephone line providing a tele-shopping service, for example. In this case, a call source as a corporation providing the tele-shopping service may transmit digital information such as catalogs to a call destination as a consumer having accessed the corporation. A first embodiment relates to a forwarding system including an in-house telephone server as described below.

FIG. 1 illustrates the forwarding system of the first embodiment. The forwarding system includes a plurality of telephone receivers 3 used by a call source and a call destination, and a telephone server 2 connected to the telephone receivers 3 via a telephone network N1. The telephone receivers 3 include a land-line phone and a cellular phone. If a cellular phone is used for the telephone receiver 3, the telephone network N1 may be a telephone network having a radio link with a cellular base station. The telephone server 2 (computer) may be controlled to connect and call the telephone receivers 3 including a call source and a call destination. The forwarding system also includes a forwarding apparatus 1 that is connected to a plurality of personal computers (PCs) 4 via a network N2 such as the Internet and a local-area network (LAN). The forwarding apparatus 1 transmits and receives electronic mails to and from each PC 4. The forwarding apparatus 1 may be a mail server (computer) delivering electronic mails from the PC 4. The forwarding apparatus 1 may be a computer connected to an external mail server. The PCs 4 receive operational inputs from the call source or the call destination, and are associated with the telephone receivers 3 used by the call source and the call destination.

The PC 4 exchanges digital information with the forwarding apparatus 1 via the network N2. The digital information includes an electronic mail, or an electronic mail with a document file and an image file attached thereto. The terminal is not limited to the PC 4. The terminals include a personal digital assistant (PDA) and a cellular phone, each exchanging a mail via the network N2. The forwarding apparatus 1 is communicably connected to the telephone server 2. The forwarding apparatus 1 receives an electronic mail from the PC 4 operated by the call source, and requests the call destination corresponding to the call source from the telephone server 2 and then receives the call destination. The forwarding apparatus 1 forwards the electronic mail to an electronic mail address receivable by the PC 4 operated by the call destination. The electronic mail and the electronic mail address are simply referred to as the "mail," and the "address," hereinafter respectively.

Figure 2:
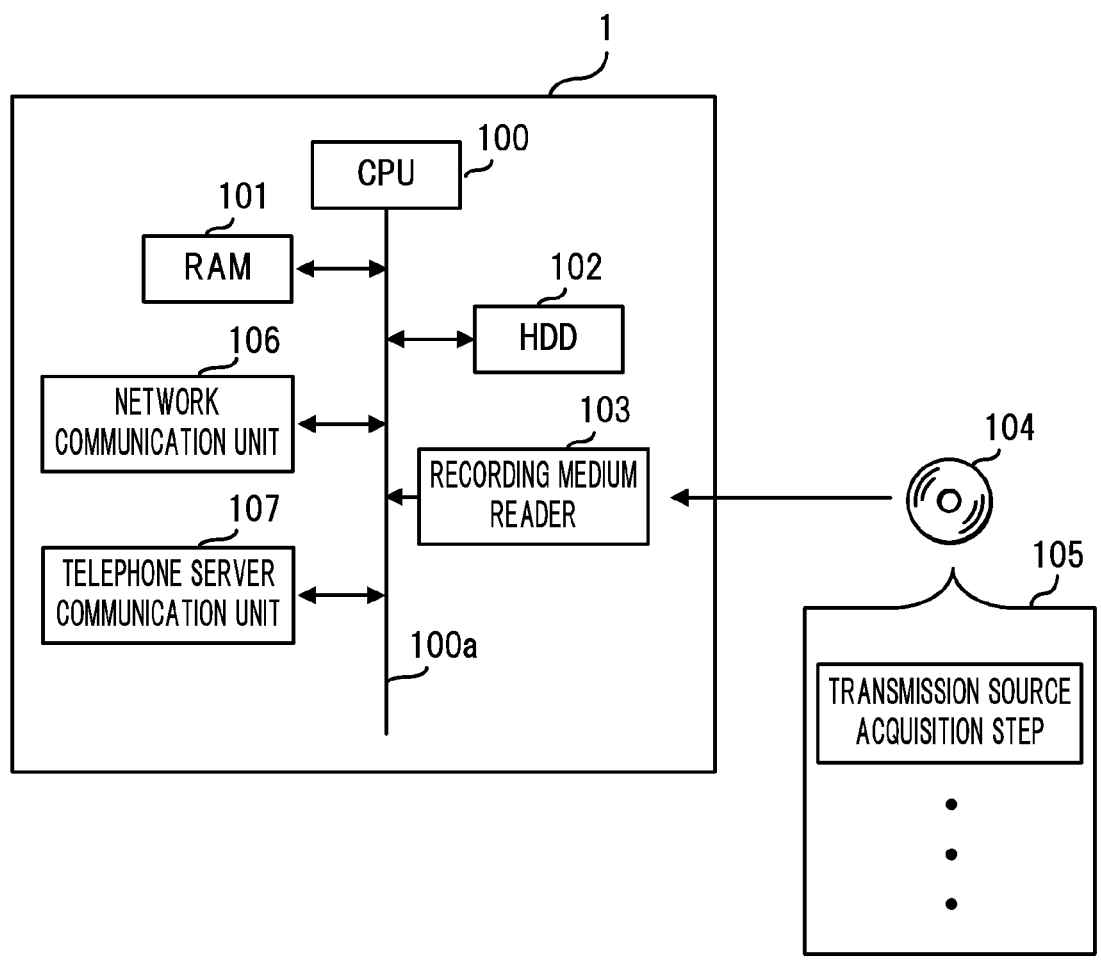
FIG. 2 is a block diagram illustrating a hardware structure of a forwarding apparatus.

FIG. 2 is a block diagram illustrating a hardware structure of the forwarding apparatus 1. The forwarding apparatus 1 includes a central processing unit (CPU) 100, a random-access memory (RAM) 101, a hard disk drive (HDD) 102, a recording medium reader 103, etc. The forwarding apparatus 1 further includes a network communication unit 106 and a telephone server communication unit 107. The network communication unit 106 exchanges an electronic mail with the PC 4 via the network N2. The telephone server communication unit 107 connected to the telephone server 2 requests a telephone number of a call destination from the telephone server 2, and then receives the telephone number transmitted in response to the request. The CPU 100 controls each hardware element in the forwarding apparatus 1 through a bus 100a. The CPU 100 reads a program 105 from a recording medium 104 loaded on the recording medium reader 103, and stores the program 105 onto the HDD 102.

The recording medium 104 may include a compact disk (CD), a digital versatile disk (DVD), or the like. The CPU 100 reads the program 105 or the like from the HDD 102 onto the RAM 101, and then executes the read program. The RAM 101 may include a static RAM (SRAM), a dynamic RAM (DRAM), a flash memory, or the like. The RAM 101 temporarily stores a variety of data generated during the execution of each program by the CPU 100. In response to an instruction from the running program 105, the CPU 100 acquires a transmission source of a received mail (transmission source acquisition step). In response to an instruction of the running program 105, the CPU 100 then acquires a call destination currently called by the transmission source, and then forwards the mail to a forwarding destination corresponding to the call destination.

Figure 3:
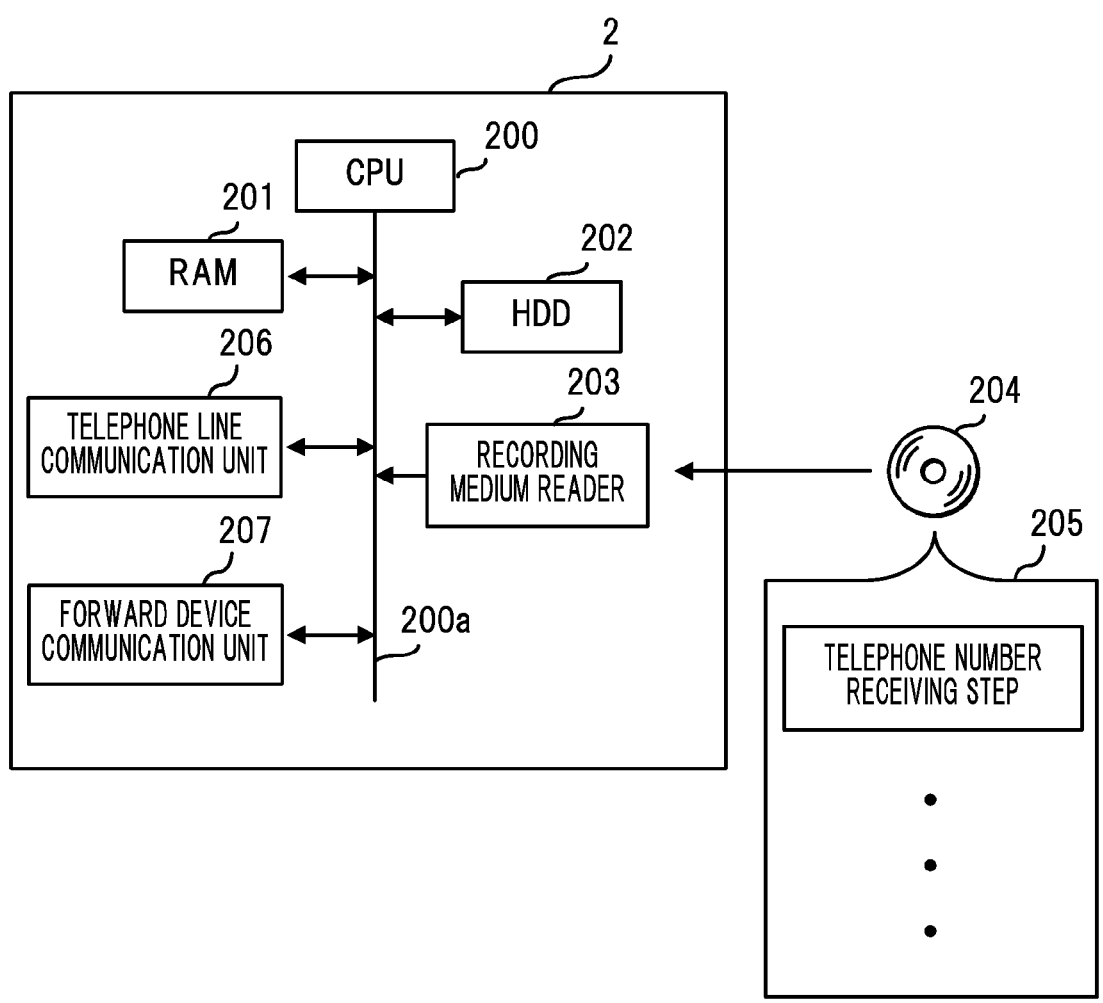
FIG. 3 is a block diagram illustrating a hardware structure of a telephone server.

FIG. 3 is a block diagram of a hardware structure of the telephone server 2. The telephone server 2 includes a CPU 200, a RAM 201, an HDD 202, a recording medium reader 203, etc. The telephone server 2 further includes a telephone line communication unit 206 and a forwarding device communication unit 207. The telephone line communication unit 206 is connected to a plurality of telephone receivers 3 via the telephone network N1 for calling. The forwarding device communication unit 207 connected to the forwarding apparatus 1 transmits a telephone number of a call destination requested by the forwarding apparatus 1. The CPU 200 controls each hardware element in the telephone server 2 via a bus 200*a*.

The CPU 200 reads a program 205 from a recording medium 204 loaded on the HDD 203 and stores the read program onto the HDD 202. The CPU 200 reads the program 205 or the like from the HDD 202 and stores the program 205 or the like onto the RAM 201 for execution. In response to an instruction from the running program 205, the CPU 200 acquires a telephone number of a call destination requested by the forwarding apparatus 1. In response to an instruction from the running program 205, the CPU 200 transmits the telephone number of the call destination to the forwarding apparatus 1.

Figure 4:
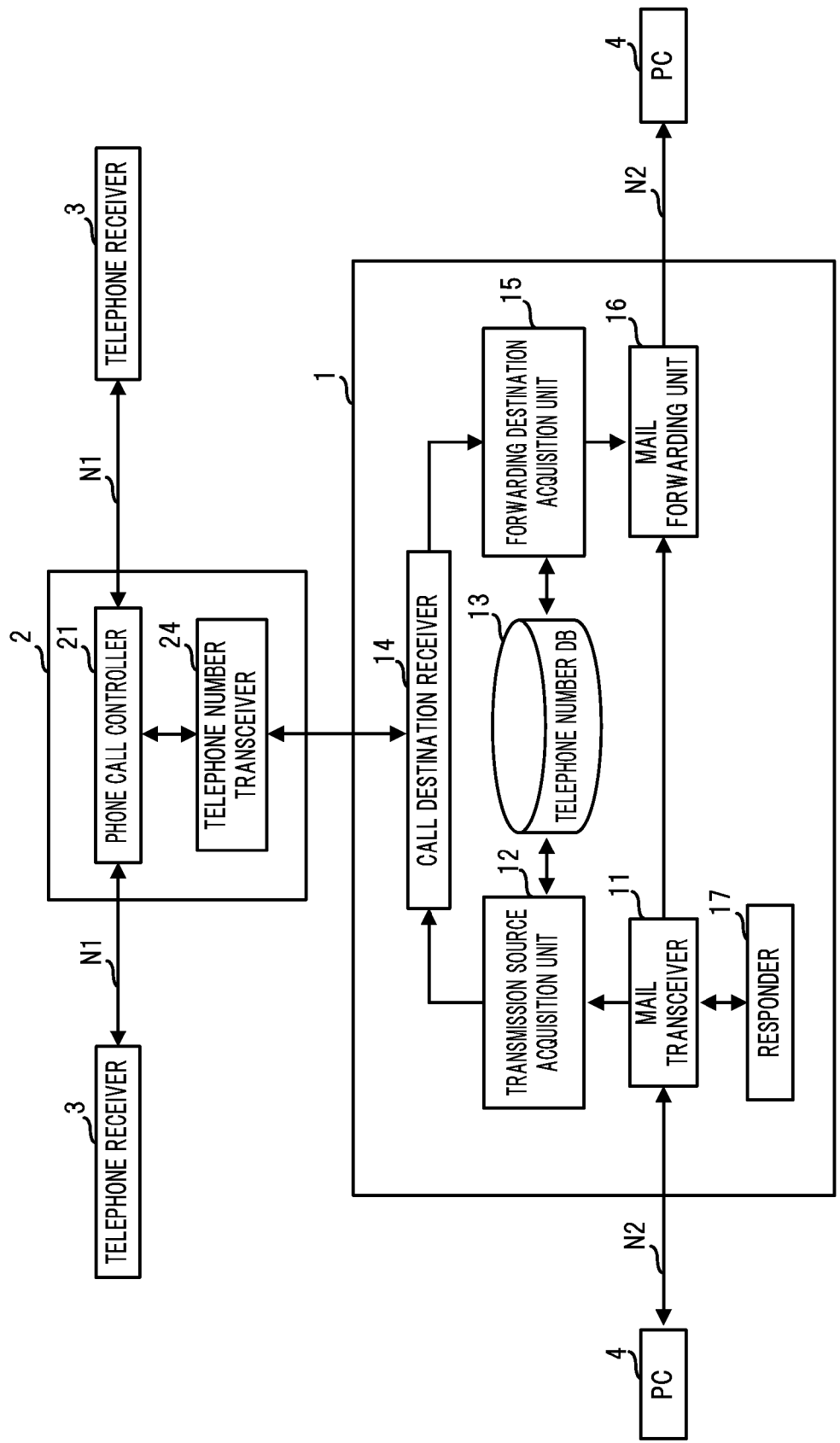
FIG. 4 is a functional block diagram of the forwarding system.

FIG. 4 is a functional block diagram of the forwarding system. The forwarding apparatus 1 includes a mail transceiver 11 as an information receiving part, a transmission source acquisition unit 12, a telephone number database 13, etc. The telephone number database 13 is organized by storing, on the HDD 102, a plurality of telephone numbers with addresses mapped thereto. The mail transceiver 11 receives a mail from the PC 4 as the call source, and temporarily stores the mail onto the HDD 102. The transmission source acquisition unit 12 reads the telephone number corresponding to a transmission source address of the mail from the telephone number database 13 to acquire the call source telephone number.

The transmission source acquisition unit 12 acquires the telephone number of the transmission source address if the telephone number is not stored on the telephone number database 13 but included in the mail. In this case, a mail including the telephone number in a mail header such as a mail subject or a message body may be transmitted from the transmission source to the forwarding apparatus 1. The forwarding apparatus 1 also includes a call destination receiver 14, a forwarding destination acquisition unit 15, a mail forwarding unit 16, and a responder 17. The call destination receiver 14 transmits, to the telephone server 2, a transmission source telephone number, and receives a call destination telephone number from the telephone server 2. The number of call destination telephone numbers is not limited to one. A plurality of call telephone numbers may be used.

If a plurality of call destinations are called using the call source telephone number, the call destination receiver 14 receives the plurality of call destination numbers. The forwarding destination acquisition unit 15 identifies the forwarding destination by reading the mail address corresponding to the call destination telephone number from the telephone number database 13, and by acquiring the mail address as a forwarding destination address. If the call destination receiver 14 receives a plurality of call destination telephone numbers, the forwarding destination acquisition unit 15 acquires a plurality of forwarding destination addresses corresponding to the plurality of call destination telephone numbers. The mail forwarding unit 16 in the forwarding apparatus 1 forwards the mail received by the mail transceiver 11 to the forwarding destination address.

The mail transceiver 11, the transmission source acquisition unit 12, the call destination receiver 14, the forwarding destination acquisition unit 15, the mail forwarding unit 16, and the responder 17 are implemented when the CPU 100 executes the program 105 to control these elements. Once the mail temporarily stored on the HDD 102 by the mail transceiver 11 is forwarded, the mail is deleted. The forwarded mail reaches the call destination when the call destination receives the mail transmitted to the forwarding destination address by operating the PC 4. If the forwarding apparatus 1 forwards the mail, the responder 17, as a notification part, transmits a reporting mail and a notification mail through the mail transceiver 11 to notify the transmission source and the forwarding destination of the forwarding operation. If the forwarding apparatus 1 fails to forward the mail, the responder 17 transmits an error mail to the transmission source of the mail through the mail transceiver 11 to notify the transmission source of a forwarding operation failure.

The telephone server 2 includes a telephone call controller 21 and a telephone number transceiver 24. The telephone call controller 21 controls calls among a plurality of telephone receivers 3 via the telephone network N1. The telephone number transceiver 24 receives a call source telephone number from the forwarding apparatus 1. The telephone call controller 21 and the telephone number transceiver 24 are implemented when the CPU 200 executes the program 205 to control the hardware elements. The telephone number transceiver 24 receives the call source telephone number from the forwarding apparatus 1. The telephone call controller 21 controls calling to the plurality of telephone receivers 3, thereby managing the called telephone number.

The telephone number transceiver 24 acquires, from the telephone call controller 21, the call destination telephone number called using the received call source telephone number, and transmits the call destination telephone number to the forwarding apparatus 1. If a plurality of call destinations are called using the call source telephone number, the telephone number transceiver 24 acquires a plurality of call destination telephone numbers and transmits the call destination telephone numbers to the forwarding apparatus 1. The telephone number and address to be stored on the telephone number database 13 is pre-stored and registered by an administrator of the forwarding apparatus 1. Optionally, the forwarding apparatus 1 may receive a mail including the telephone number from a user having requested the telephone number to be registered, and register the mail together with a transmission source address.

In this case, the forwarding apparatus 1 receives the mail transmitted to a specific address preset for registration. The forwarding apparatus 1 reads, from the telephone number database 13, the telephone number corresponding to the transmission source address of the received mail, and transmits, to the telephone server 2, the telephone number together with a confirmation request. The telephone server 2 confirms the telephone number by calling the telephone having the telephone number corresponding to the transmission source address. For example, a voice message confirming the telephone number to be registered is transmitted from the telephone server 2 to the telephone receiver 3, and a user enters the telephone number on the telephone receiver 3 in accordance with the voice message. The confirmation of the telephone number is thus performed. The forwarding apparatus 1 returns the mail with an authentication code attached thereto. If the forwarding apparatus 1 receives a confirmation mail including an authentication code from the transmission source address, the forwarding apparatus 1 determines that a mail including the telephone number has been received from an authorized user requesting registration. The forwarding apparatus 1 stores the telephone number included in the mail in the telephone number database 13 with the transmission source address mapped to the telephone number.

FIG. 5 illustrates a record layout of the telephone number database 13. As illustrated in FIG. 5, a telephone number and an address of each user with the user name mapped thereto are stored. For example, a user name "staff member A" is mapped to a telephone number "1111-0001" used by the staff member A in telephone conversation, and an address "a@jp.xxx.com" for use in the transmission and reception of a mail.

FIGS. 6A and 6B illustrate mail transmission screens. A mail to be transmitted to a registration address on the forwarding apparatus 1 is displayed on the mail transmission screen illustrated in FIG. 6A. A transmission source address "a@jp.xxx.com" and a registration address for a transmission destination "reg@mail.xxx.com" are illustrated in FIG. 6A. The telephone number "1111-0001" to be registered is displayed as a message body. The mail transmission screen includes a transmit button for transmitting the mail, a cancel button for canceling the transmission of the mail, etc.

FIG. 6B illustrates the mail transmission screen having a mail returned from the forwarding apparatus 1. A transmission source address including an authentication code "200902061015" is displayed on the mail transmission screen. Moreover, subject "registration for participation" is displayed on the mail transmission screen in FIG. 6B. Also displayed on the mail transmission screen is a mail message stating that a registration application has been made by a registration applicant having an address "a@jp.xxx.com" and requesting a reply.

FIG. 7 illustrates an example of the mail transmission screen. The mail transmission screen of FIG. 7 illustrates that a mail with a file attached thereto has been transmitted to the forwarding apparatus 1 in order to forward the mail to a forwarding destination. FIG. 7 illustrates a file name "siryou.pdf" of the attached file, a forwarding mail address "tel@mail.xxx.com," and subject "matter discussed over phone." The message body related to the attached file reads "see p3 for detail."

FIGS. 8A and 8B illustrate examples of error mail. An error mail is transmitted to a transmission source of the mail if the forwarding apparatus 1 fails to forward the mail. FIG. 8A illustrates an error mail that is transmitted if the transmission source address of the mail is not stored in the telephone number database 13. The error mail of FIG. 8A includes subject "error notification" and a message indicating a mail forwarding operation failure and an unregistered transmission source address. The error mail also includes the content of the mail, the forwarding operation of which has failed. FIG. 8B illustrates an error mail that is transmitted if the acquisition of the call destination telephone number from the telephone server 2 has failed. Referring to FIG. 8B, the error mail includes a message stating that the acquisition of the call destination telephone number has failed.

FIGS. 9A and 9B illustrate an error mail and a reporting mail, respectively. FIG. 9A illustrates an error mail that is transmitted if an address corresponding to the call destination telephone number is not stored in the telephone number database 13. Displayed on the screen of FIG. 9A are a call destination telephone number "1111-0002" and a message stating a mail forwarding operation failure and that a mail address corresponding to the call destination telephone number is not registered. FIG. 9B illustrates a reporting mail that is transmitted to the transmission source by the forwarding apparatus 1 if the forwarding apparatus 1 has forwarded the mail to the forwarding destination address. FIG. 9B illustrates the reporting mail that the forwarding apparatus 1 transmits to the transmission source of the mail if the forwarding apparatus 1 has forwarded the mail to the forwarding destination. Referring to FIG. 9B, subject "forwarding report" and a message reporting that the mail has been forwarded are displayed. The message includes a call source telephone number "1111-0001" and a user name "staff member A" as the call source. The message further includes a call destination telephone number "1111-0002" and a user name "staff member B" as the call destination. The user names are read from the telephone number database 13.

FIG. 10 illustrates a forwarded mail. The forwarded mail includes the mail received by the forwarding apparatus 1 with a message generated by the responder 17 attached thereto. The responder 17 generates and inputs call time and date "2008.11.25 18:02" and user name "staff member B" for the subject. For the message, the responder 17 generates and inputs a message including "marketing department" as an assigned department of a call partner, a user name "staff member A" of the call source, and "administrative department" as an assigned department of the call source. The assigned departments of the call partner and the call source may be stored with the respective users mapped thereto onto the telephone number database 13.

Figure 11:
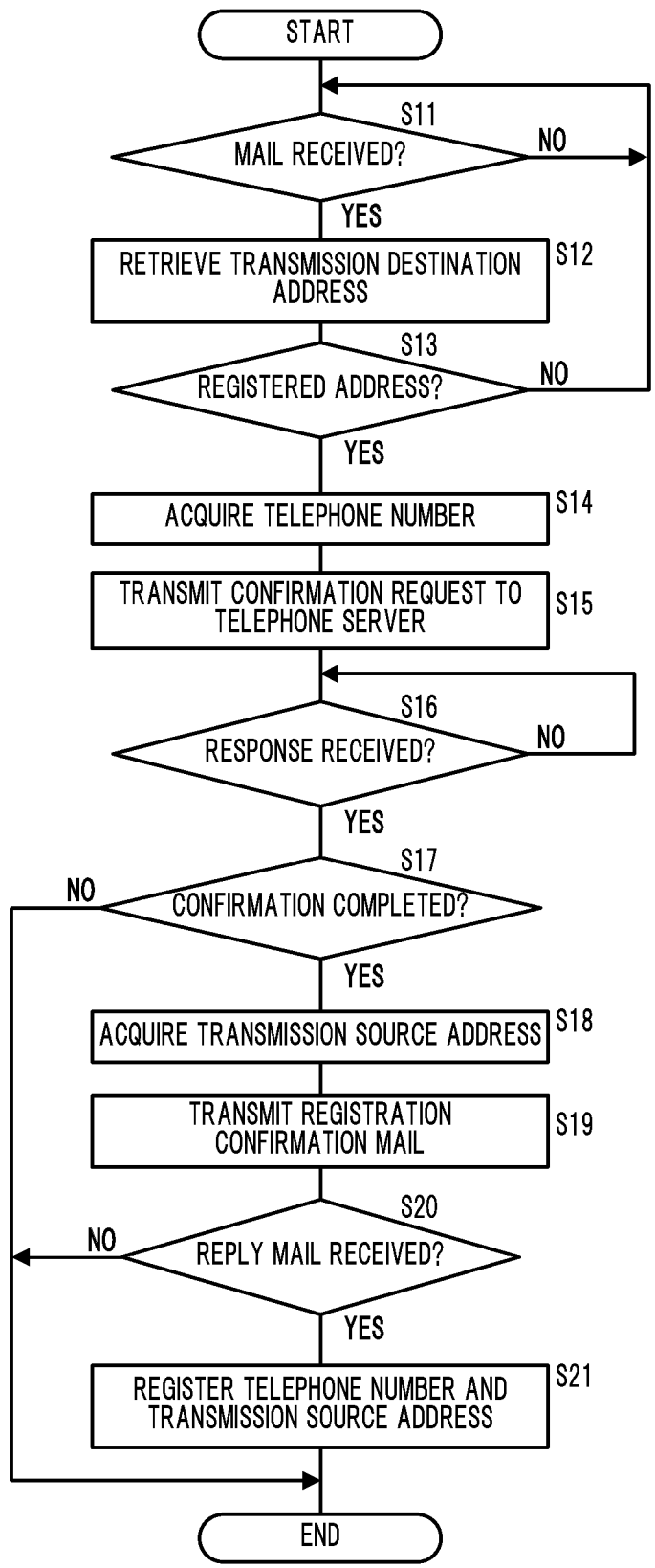
FIG. 11 is a flowchart of a registration process.

FIG. 11 is a flowchart of a registration process. The CPU 100 in the forwarding apparatus 1 performs the registration process in order to register the telephone number with the address mapped thereto. The CPU 100 determines whether a mail has been received (step S11). If it is determined in step S11 that no mail has been received (no in step S11), the CPU 100 waits on standby for a reception of a mail. If it is determined in step S11 that a mail has been received (yes in step S11), the CPU 100 acquires a transmission destination address (step S12). The CPU 100 determines whether the transmission destination address is a registered address (step S13). If it is determined in step S13 that the transmission destination address is not registered (no in step S13), the CPU 100 returns to step S11 to determine whether a mail has been received.

If it is determined in step S13 that the transmission destination address is registered (yes in step S13), the CPU 100 acquires a telephone number included in the mail (step S14). The CPU 100 determines whether a reply to a confirmation request has been received from the telephone server 2 (step S16). If it is determined in step S16 that no reply has been received (no in step S16), the CPU 100 waits on standby for a reception of a reply. If it is determined in step S16 that a reply has been received (yes in step S16), the CPU 100 determines whether the reply indicates a confirmation completion (step S17). If it is determined in step S17 that the reply indicates no confirmation completion (no in step S17), the CPU 100 ends the registration process.

If it is determined in step S17 that the reply indicates a confirmation completion (yes in step S17), the CPU 100 acquires a transmission source address from a header of the mail (step S18). The CPU 100 transmits a registration confirmation mail to the transmission source address to confirm the address to be registered (step S19). The CPU 100 determines whether a reply mail has been received in response to the transmission of the registration confirmation mail (step S20). If it is determined in step S20 that no reply mail has been received (no in step S20), the CPU 100 ends the registration process. If it is determined in step S20 that a reply mail has been received (yes in step S20), the CPU 100 registers the telephone number and the transmission source address (step S21), and ends the registration process.

Figure 12:
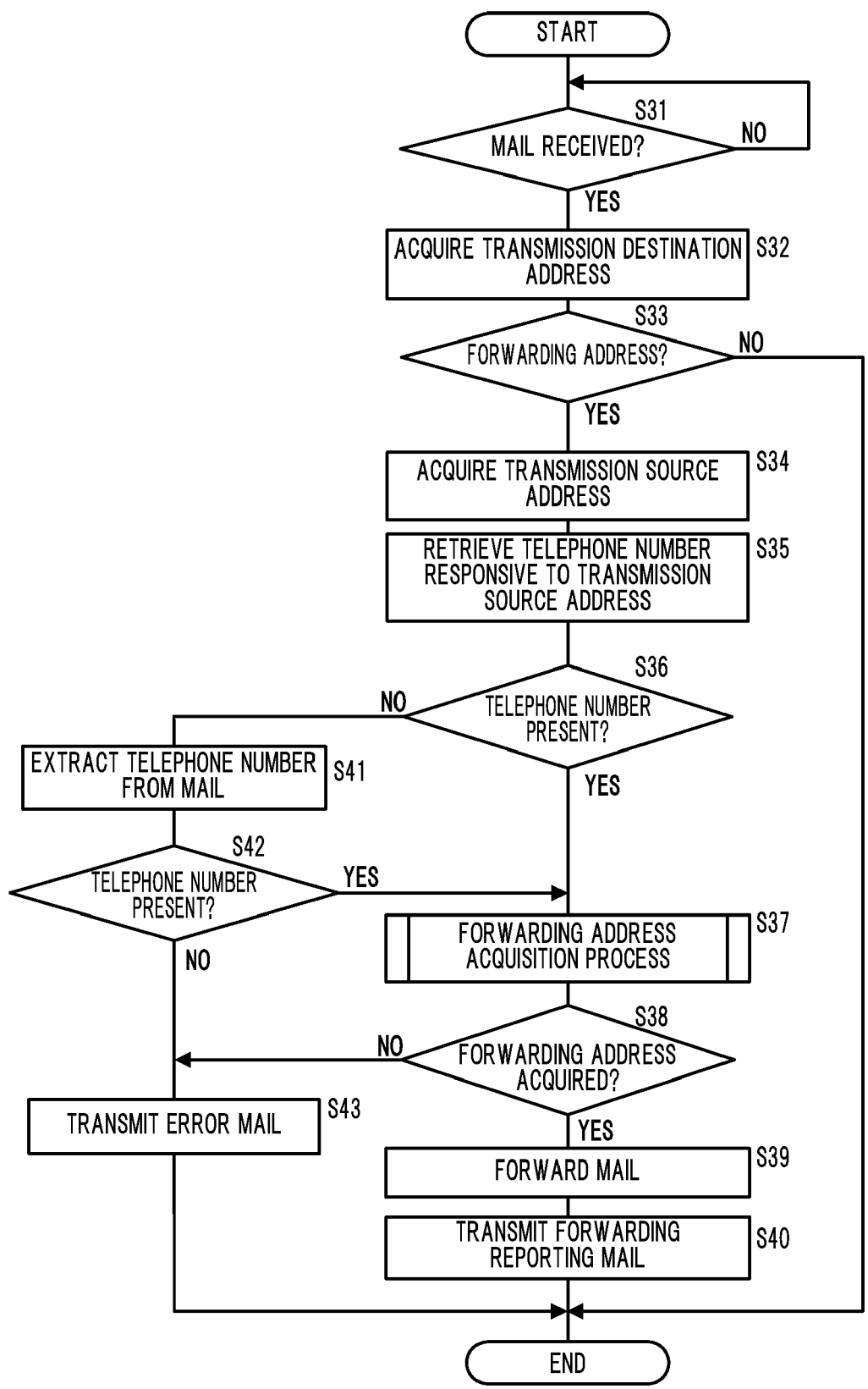
FIG. 12 is a flowchart of a mail reception process.

FIG. 12 is a flowchart illustrating a mail reception process. The CPU 100 in the forwarding apparatus 1 performs the mail reception process in order to receive a mail from a call source and to forward the mail to a forwarding destination. The CPU 100 determines whether a mail has been received (step S31).

If it is determined in step S31 that no mail has been received (no in step S31), the CPU 100 waits on standby for a reception of a mail. If it is determined in step S31 that a mail has been received (yes in step S31), the CPU 100 acquires a transmission destination address from a header of the mail (step S32). The CPU 100 determines whether the transmission destination address is a forwarding destination address (step S33). If it is determined in step S33 that the transmission destination address is not a forwarding destination address (no in step S33), the mail reception process ends.

If it is determined in step S33 that transmission destination address is a forwarding destination address (yes in step S33), the CPU 100 acquires a transmission source address from a header of the mail (step S34). The CPU 100 retrieves, from the telephone number database 13, a telephone number corresponding to the transmission source address (step S35). The CPU 100 determines from retrieval results whether a telephone number is present (step S36). If it is determined in step S36 that a telephone number is present (yes in step S36), the CPU 100 executes a forwarding destination acquisition process to be discussed later to acquire a forwarding destination address identifying a forwarding destination (step S37). The CPU 100 determines whether a forwarding destination address has been acquired through the forwarding destination acquisition process (step S38).

If it is determined in step S38 that a forwarding destination address has been acquired (yes in step S38), the CPU 100 forwards the mail to the forwarding destination address (step S39). The CPU 100 transmits to the transmission source address a forwarding reporting mail (step S40), and ends the mail reception process. If it is determined in step S36 that no telephone is present (no in step S36), the CPU 100 extracts a telephone number from the mail (step S41). The CPU 100 determines from the extraction results whether a telephone number is present (step S42). If it is determined in step S42 that a telephone number is present (yes in step S42), the CPU 100 proceeds to step S37 to execute a forwarding destination acquisition process.

If it is determined in step S42 that no telephone number is present (no in step S42), the CPU 100 transmits an error mail to the transmission source address (step S43), and ends the mail reception process. If it is determined in step S38 that no forwarding destination address has been acquired (no in step S38), the CPU 100 proceeds to step S43 to transmit an error mail and ends the mail reception process.

Figure 13:
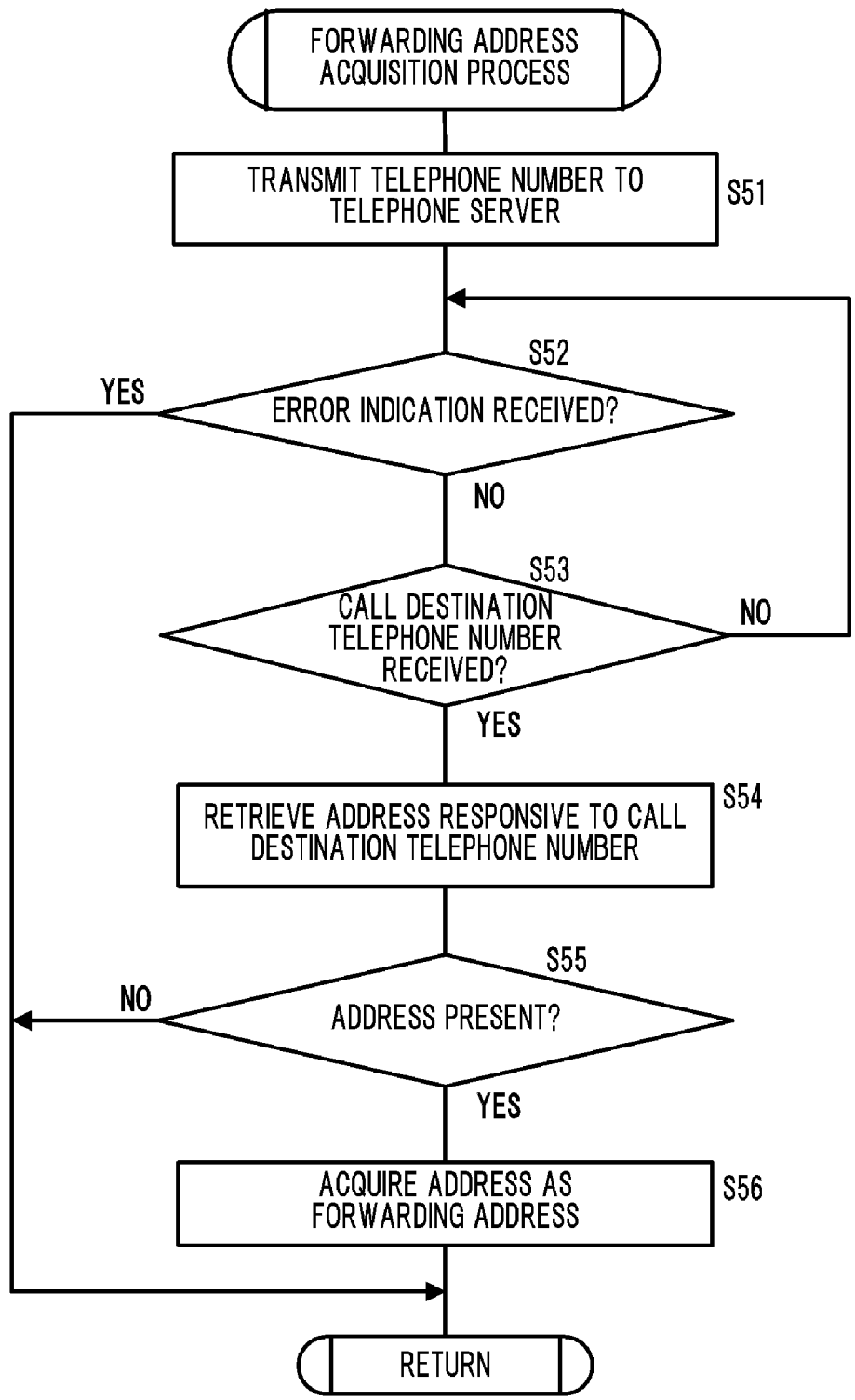
FIG. 13 is a flowchart of a forwarding destination acquisition process.

FIG. 13 is a flowchart illustrating the forwarding destination acquisition process. The forwarding destination acquisition process is performed in step S37 of the mail reception process illustrated in FIG. 12. The CPU 100 in the forwarding apparatus 1 transmits, to the telephone server 2, the telephone number corresponding to the transmission source address (step S51). The CPU 100 determines whether an error indication has been received from the telephone server 2 (step S52). If it is determined in step S52 that no error indication has been received (no in step S52), the CPU 100 determines whether a call destination telephone number has been received from the telephone server 2 (step S53). If it is determined in step S53 that no call destination telephone number has been received (no in step S53), the CPU 100 returns to step S52 to determine whether an error indication has been received.

If it is determined in step S53 that a call destination telephone number has been received (yes in step S53), the CPU 100 retrieves from the telephone number database 13 an address corresponding to the call destination telephone number (step S54). The CPU 100 determines from retrieval results whether an address corresponding to the call destination telephone number is present (step S55). If it is determined in step S55 that the address corresponding to the call destination telephone number is present (yes in step S55), the CPU 100 acquires the address as a forwarding destination address (step S56). The forwarding destination acquisition process thus ends. If it is determined in step S52 that an error indication has been received (yes in step S52), the CPU 100 ends the forwarding destination acquisition process. If it is determined in step S55 that no such address is present (no in step S55), the CPU 100 ends the forwarding destination acquisition process.

Figure 14:
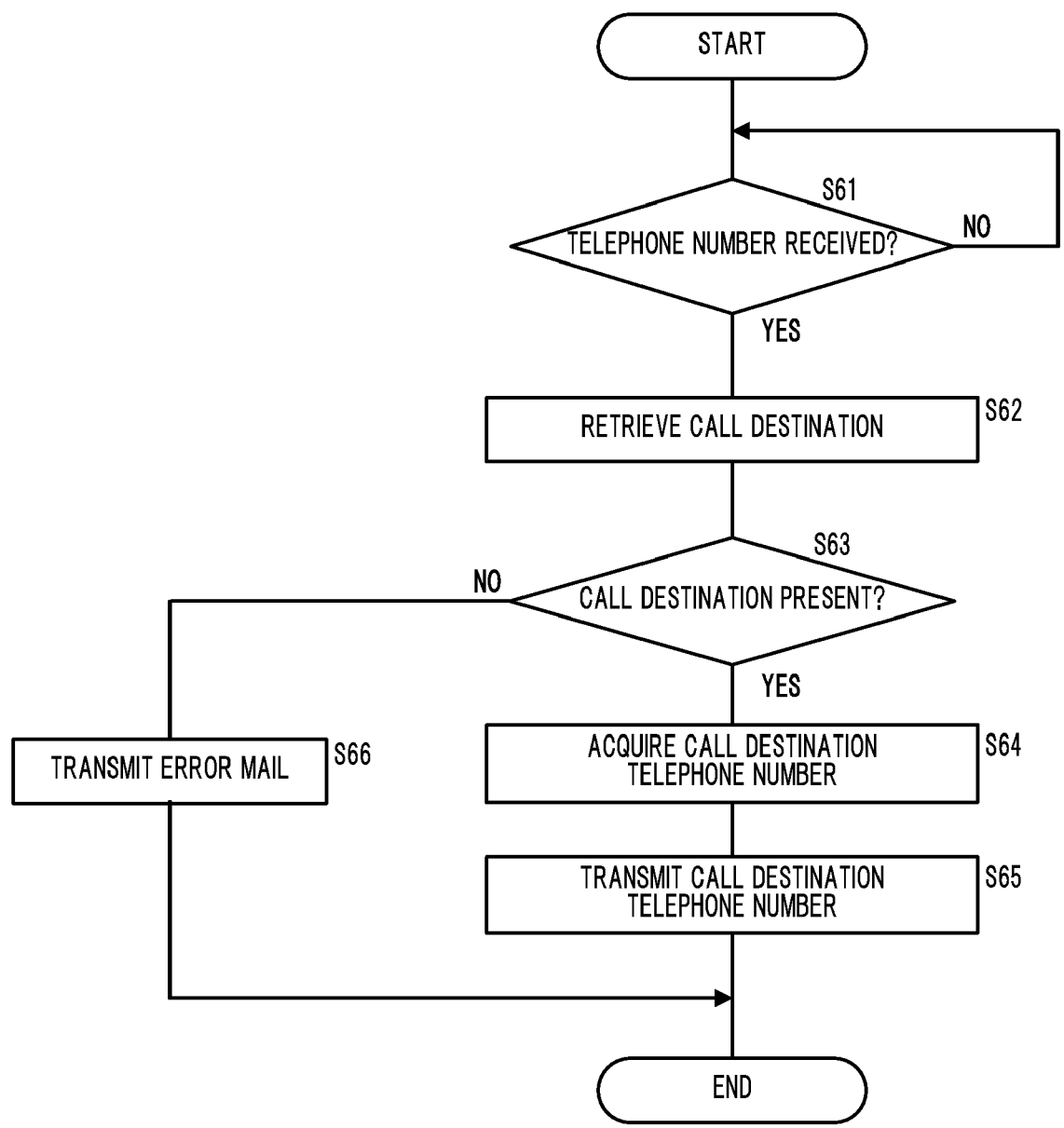
FIG. 14 is a flowchart of a telephone number transmission process.

FIG. 14 is a flowchart illustrating a telephone number transmission process. The CPU 200 in the telephone server 2 performs the telephone number transmission process in order to transmit to the forwarding apparatus 1 the call destination telephone number in response to the telephone number transmitted from the forwarding apparatus 1. The CPU 200 determines whether a telephone number has been received from the forwarding apparatus 1 (step S61). If it is determined in step S61 that no telephone number has been received (no in step S61), the CPU 200 waits on standby for a reception of a telephone number. If it is determined in step S61 that a telephone number has been received (yes in step S61), the CPU 200 retrieves a call destination called through the telephone number (step S62).

The CPU 200 determines from retrieval results whether a call destination is present (step S63). If it is determined in step S63 that a call destination is present (yes in step S63), the CPU 200 acquires the call destination telephone number (step S64). The CPU 200 transmits the call destination telephone number to the forwarding apparatus 1 (step S65), and ends the telephone number transmission process. If it is determined in step S63 that no call destination is present (no in step S63), the CPU 200 transmits an error indication to the forwarding apparatus 1 (step S66), and ends the telephone number transmission process.

Figure 15:
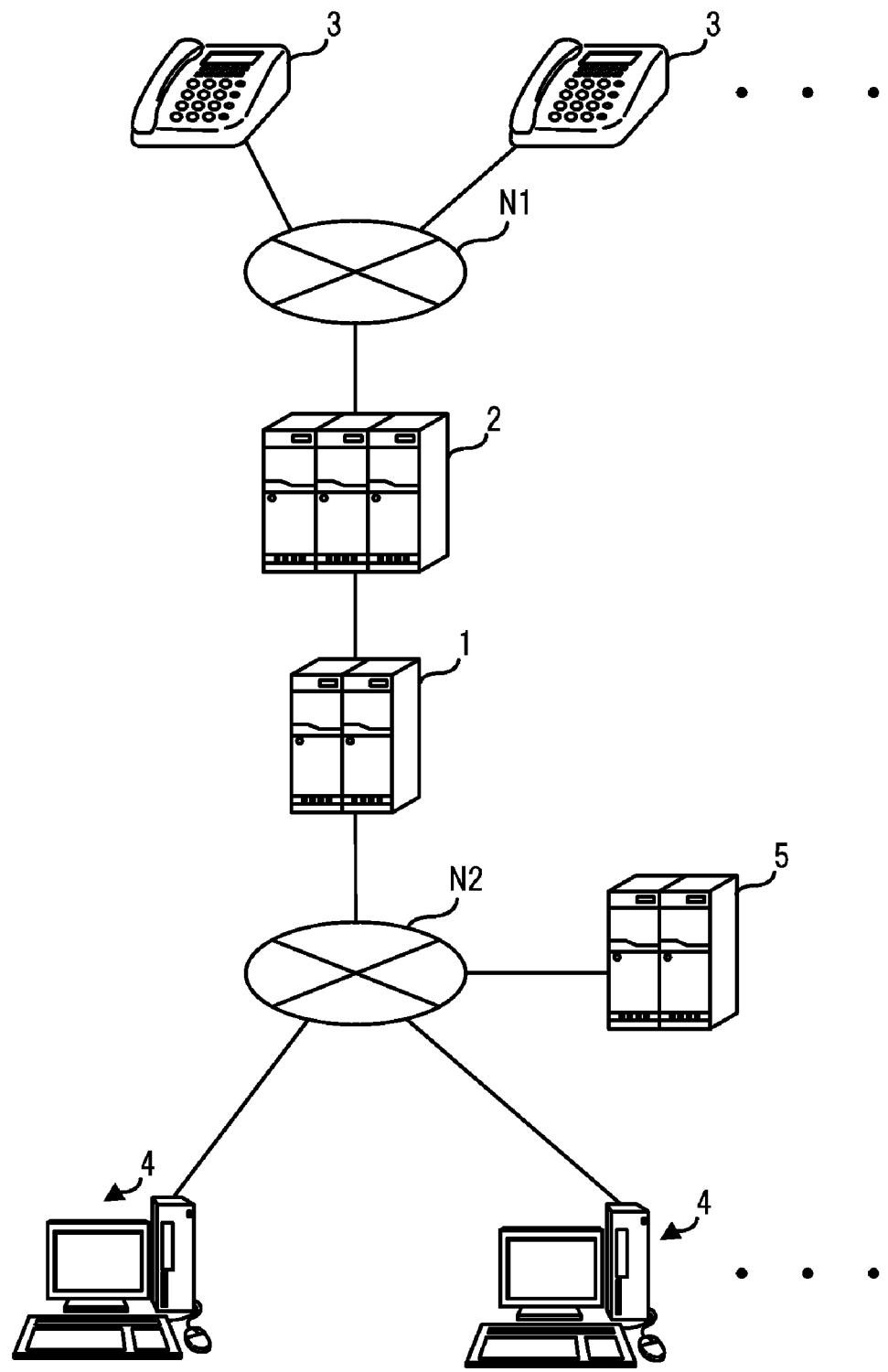
FIG. 15 illustrates another example of the forwarding system.

FIG. 15 illustrates another example of the forwarding system. The forwarding apparatus 1 described above forwards the received mail to a forwarding destination address. The technique is not limited to this method. For example, the mail may be forwarded to a particular area of an external file server accessible by the PC 4 operated by the call destination. As illustrated in FIG. 15, at least one file server 5 is connected to the network N2. The file server 5 includes, in the storage thereof, particular areas respectively accessed by the PCs 4. The particular areas are indicated by file paths. The telephone number database 13 may store the file path accessed by each user according to a telephone number.

FIG. 16 illustrates a table of a record layout of the telephone number database 13. As illustrated in FIG. 16, a file path "\\server A\staff member A\busy public folder" is stored with a user name "staff member A" mapped thereto. This file path indicates that the folder "staff member A" accessible by the staff member A is set on the file server 5 corresponding to the server A. The file path also indicates that the folder "busy public folder" permitting a mail to be forwarded thereto from the forwarding apparatus 1 is set in the folder name "staff member A." If the staff member A is a call destination, a mail is forwarded to the folder "busy public folder" of the staff member A.

In accordance with the first embodiment, the mail received from the transmission source by the forwarding apparatus 1 is temporarily stored, and forwarded to the forwarding destination. Even if a call destination in a busy state may not receive the mail, the call destination may later receive the mail after finishing the call. In accordance with the first embodiment, the forwarding system includes the forwarding apparatus 1 working in cooperation with the in-house telephone system. The present invention is not limited to this arrangement. The forwarding system may include the forwarding apparatus 1 installed in a telephone company operating the telephone server 2. In such a case, the telephone number database 13 stores the addresses with the telephone numbers managed by the telephone server 2 of the telephone company and respectively mapped to the addresses. This arrangement allows a mail to be forwarded from a business corporation as a call source to a customer as a call destination. This arrangement also eliminates the need for the business corporation to obtain addresses of customers beforehand. This arrangement also prevents the addresses of the customers from being known to the business corporation. The customers may be free from the reception of unwanted mails.

The call destination telephone number to be transmitted from the telephone server 2 to the forwarding apparatus 1 is not limited to a call destination telephone number in a busy state. The telephone number transceiver 24 in the telephone server 2 acquires, as the call destination telephone numbers, the telephone numbers of the telephones that were called through the call source telephone numbers within a given time period of several past hours or past day. The telephone number transceiver 24 transmits to the forwarding apparatus 1 the call destination telephone number. In such a case, the telephone number transceiver 24 may acquire the call destination telephone number by referencing a call history.

Second Embodiment

Figure 17:
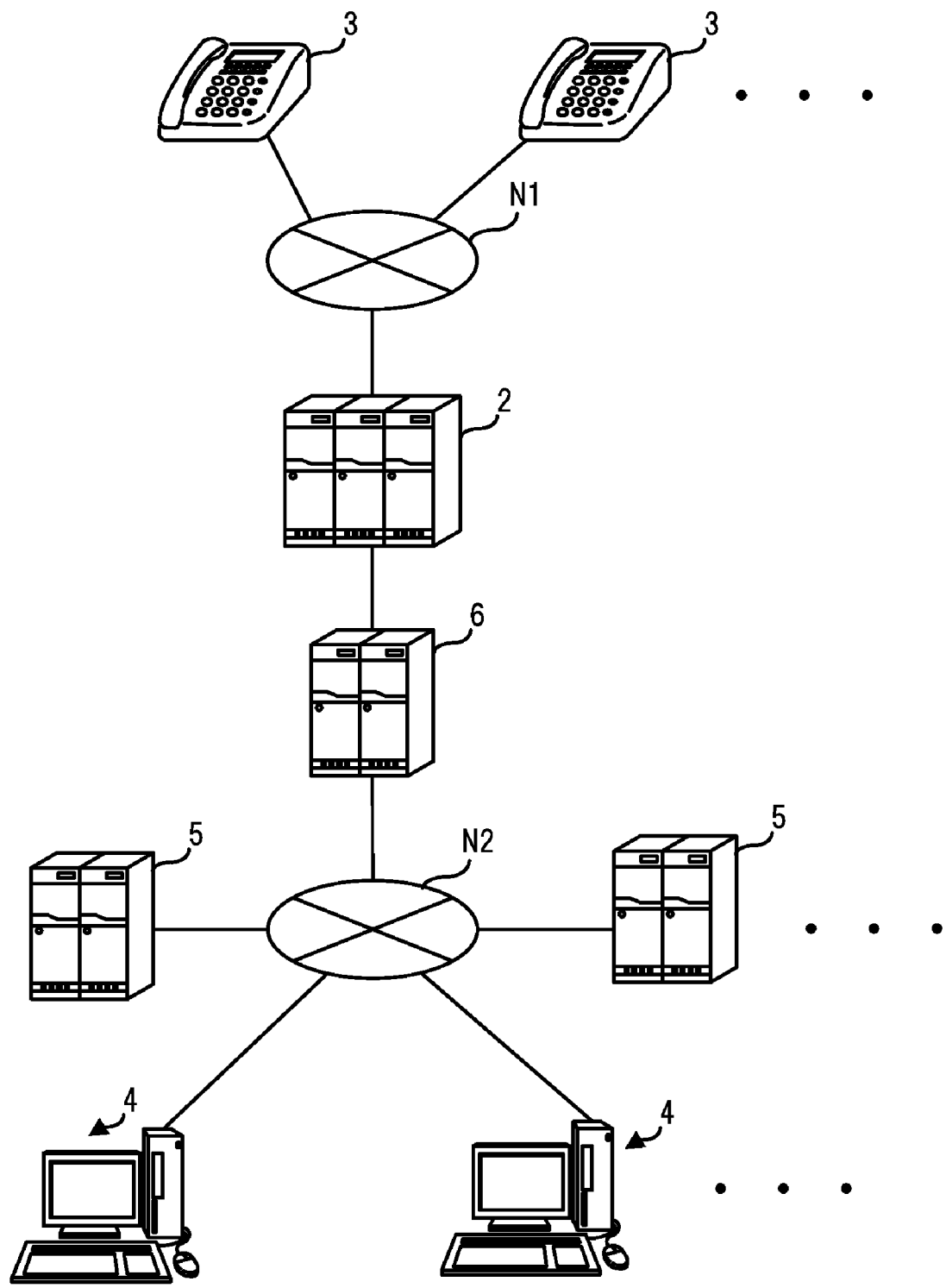
FIG. 17 illustrates a forwarding system.

FIG. 17 illustrates a forwarding system of a second embodiment. In accordance with the second embodiment, a file is stored onto a particular area of a file server accessible by the call source, and the file is forwarded to a particular area of a file server accessible by the call destination. The forwarding system includes a plurality of file servers 5 that are accessible by the PCs 4 via the network N2. The file server 5 includes particular areas that permit the PCs 4 to access thereto. A forwarding apparatus 6 requests from the telephone server 2 the call source telephone number and the call destination telephone number, called or in a busy state. The forwarding apparatus 6 receives the call source telephone number and the call destination telephone number transmitted in response. The forwarding apparatus 6 acquires, as the reception destination of the file, a file path corresponding to the call source telephone number. The forwarding apparatus 6 acquires, as the forwarding destination of the file, a file path corresponding to the call destination telephone number. If a file stored after the start of calling is present at the call destination, the forwarding apparatus 6 forwards the file to the file path of the forwarding destination.

Figure 18:
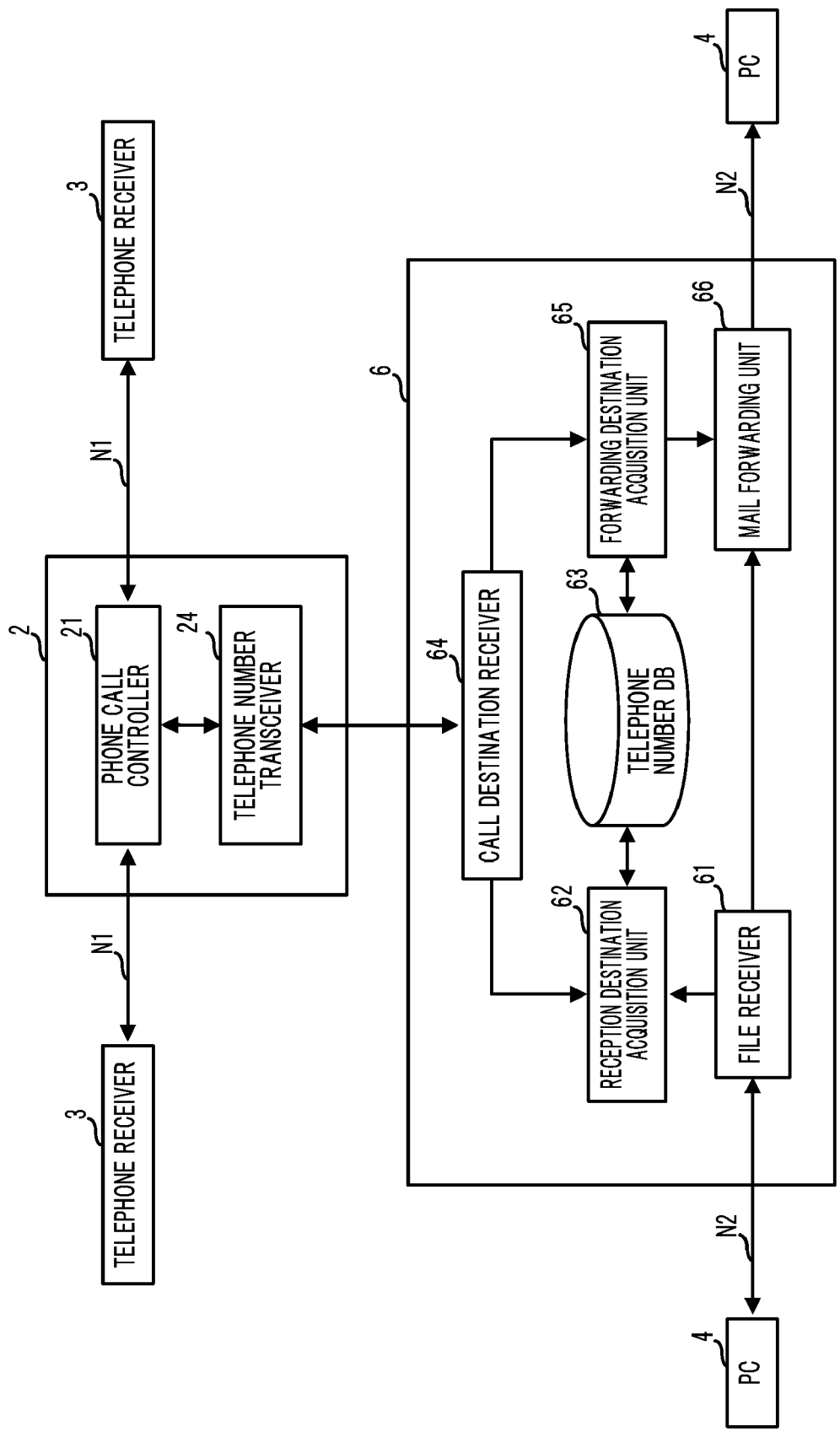
FIG. 18 is a functional block diagram of the forwarding system.

FIG. 18 is a functional block diagram of the forwarding system. The forwarding apparatus 6 includes a call destination receiver 64, a file receiver 61, a reception destination acquisition unit 62, a telephone number database 63, etc. The call destination receiver 64 requests, from the telephone server 2, the call source telephone number and the call destination telephone number, called or in a busy state, and receives the telephone numbers transmitted in response. The reception destination acquisition unit 62 receives from the telephone number database 63 the file path corresponding to the call source telephone number and acquires the file path as the reception destination. The file receiver 61 reads and receives a file stored after the start of the calling, from among the files stored on the particular areas of the file server 5 indicated by the file path of the reception destination.

The forwarding apparatus 6 further includes a forwarding destination acquisition unit 65 and a mail forwarding unit 66, etc. The forwarding destination acquisition unit 65 reads, from the telephone number database 63, the file path corresponding to the call destination telephone number received by the call destination receiver 64, and acquires the file path as a forwarding destination for identification. The mail forwarding unit 66 forwards the file received by the file receiver 61 to the particular area of the file server 5 indicated by the file path of the forwarding destination acquired by the forwarding destination acquisition unit 65. The call destination operates the PC 4, thereby accessing the particular area of the file server 5 indicated by the file path of the forwarding destination and reading the forwarded file. The forwarded file thus reaches the forwarding destination.

FIG. 19 illustrates a record layout of the telephone number database 63. Referring to FIG. 19, a telephone number and a file path of each user are stored with the user name mapped thereto. For example, a user name "staff member A" is mapped to a telephone number "1111-0001" used by the staff member A for calling, and a file path "\\serverA\staff member A\busy public folder" accessible by the staff member A.

Figure 20:
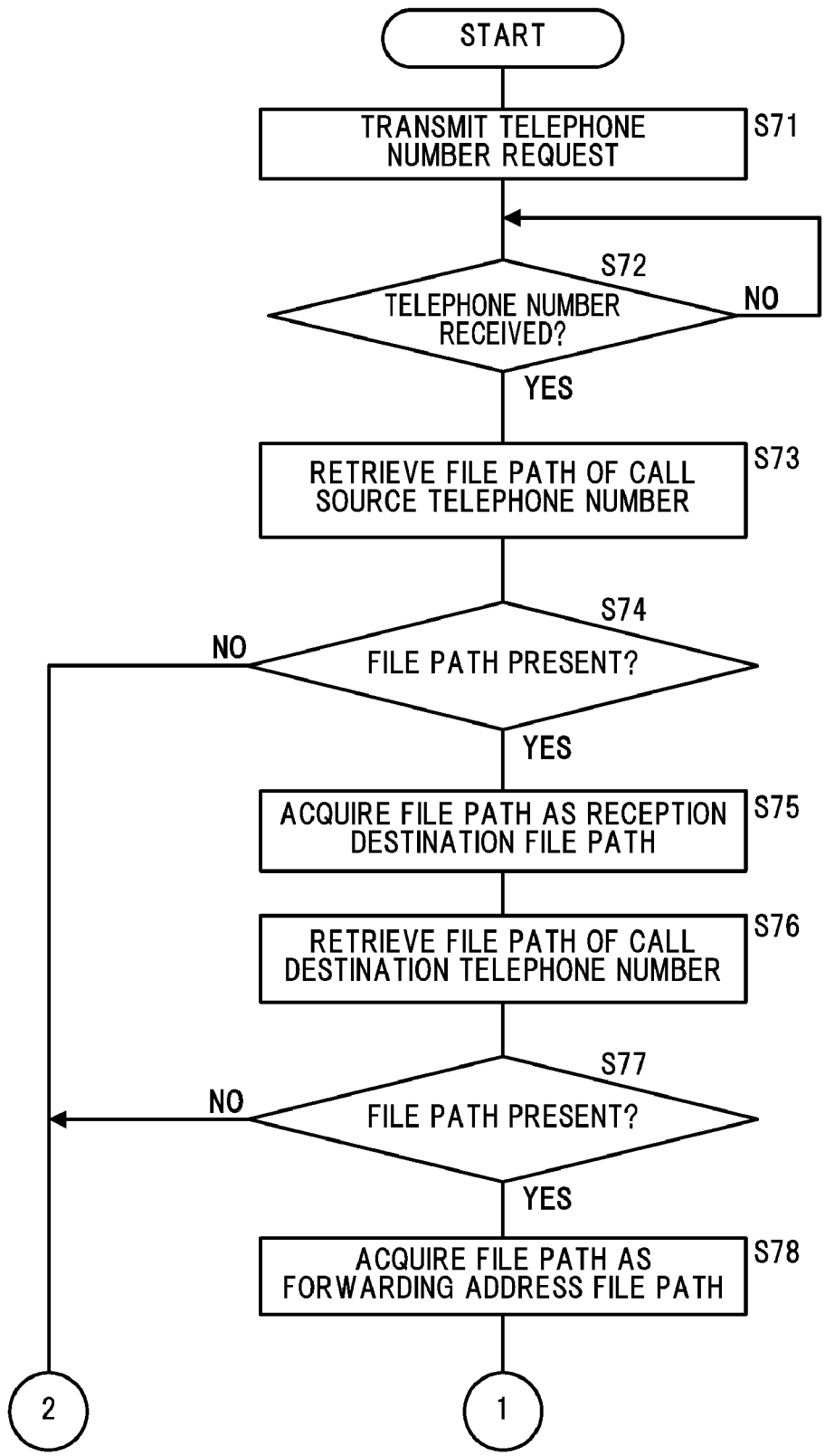
FIG. 20 is a flowchart illustrating a file forwarding process.
Figure 21:
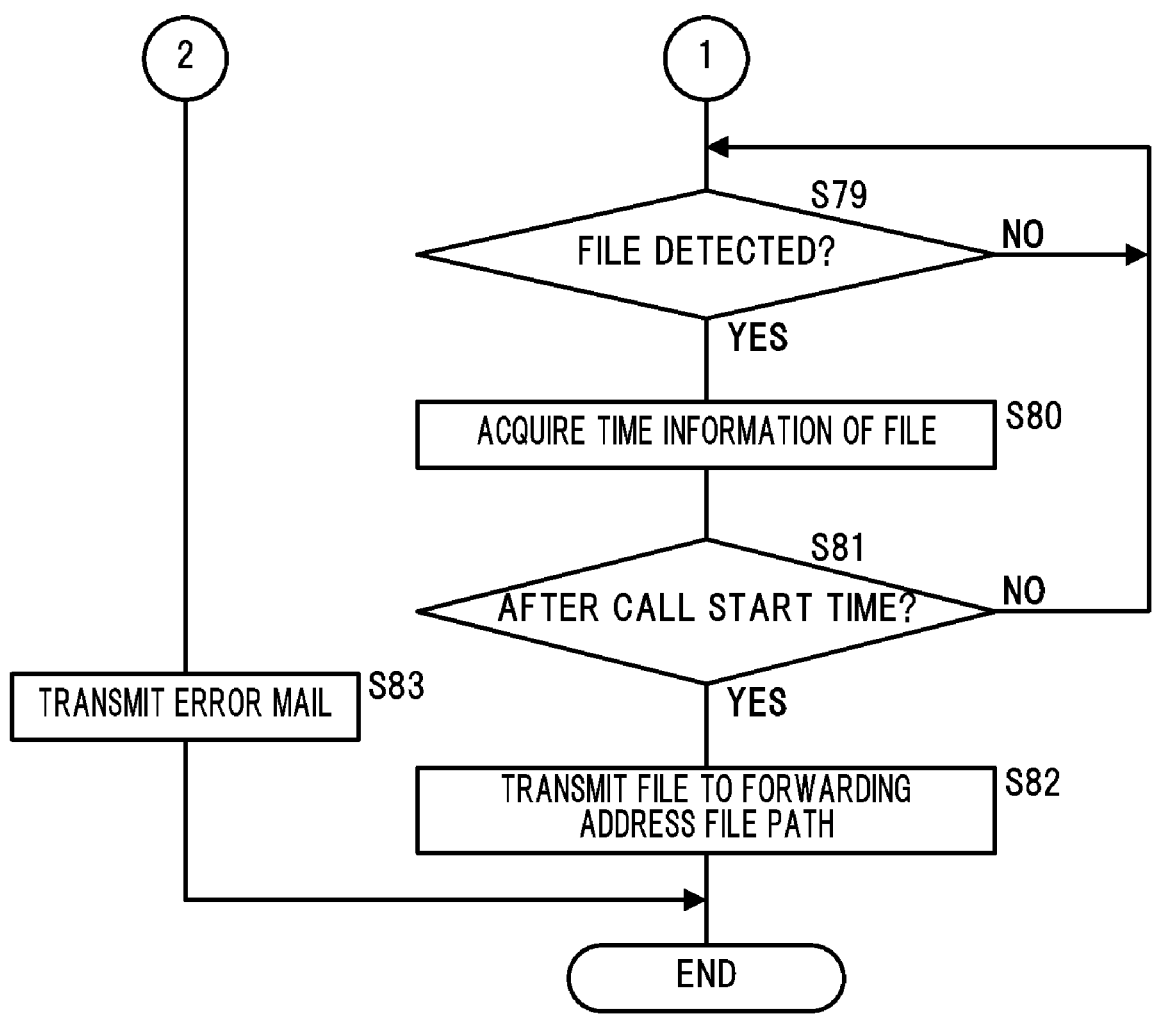
FIG. 21 is a continuation of the flowchart of FIG. 20.

FIGS. 20 and 21 depict flowcharts of a file forwarding process. The CPU 100 in the forwarding apparatus 6 performs the file forwarding process in order to forward a file from the file server 5 to a forwarding destination. The CPU 100 transmits, to the telephone server 2, a telephone number request requesting a telephone number called or in a busy state (step S71). The CPU 100 determines whether a telephone number has been received together with call start time (step S72). If it is determined in step S72 that no telephone number has been received (no in step S72), the CPU 100 waits on standby for a reception of a telephone number. If it is determined in step S72 that a telephone number has been received (yes in step S72), the CPU 100 retrieves, from the telephone number database 63, a file path corresponding to the call source telephone number (step S73). The CPU 100 determines from retrieval results whether a file path is present (step S74).

If it is determined in step S74 that a file path is present (yes in step S74), the CPU 100 acquires the file path as a reception destination file path (step S75). The CPU 100 retrieves, from the telephone number database 63, a file path corresponding to the call destination telephone number (step S76). The CPU 100 then determines from retrieval results whether a file path is present (step S77). If it is determined in step S77 that a file path is present (yes in step S77), the CPU 100 acquires the file path as a forwarding destination file path (step S78). The CPU 100 determines whether a file stored at the reception destination file path has been detected (step S79). If it is determined in step S79 that no file has been detected (no in step S79), the CPU 100 waits on standby for a detection of a file. If it is determined in step S79 that a file has been detected (yes in step S79), the CPU 100 acquires time information of the file path (step S80). The CPU 100 determines whether the time information is after the call start time or not (step S81).

If it is determined in step S81 that the time information is not after the call start time (no in step S81), the CPU 100 returns to step S79 to determine whether a file has been detected. If it is determined in step S81 that the time information is after the call start time (yes in step S81), the CPU 100 forwards the file to the forwarding destination file path (step S82), and ends the process. The CPU 100 transmits an error mail to the transmission source address (step S83) if it is determined in step S74 or step S77 that no file path is present (no in step S74 or no in step S77). The CPU 100 then ends the process.

Figure 22:
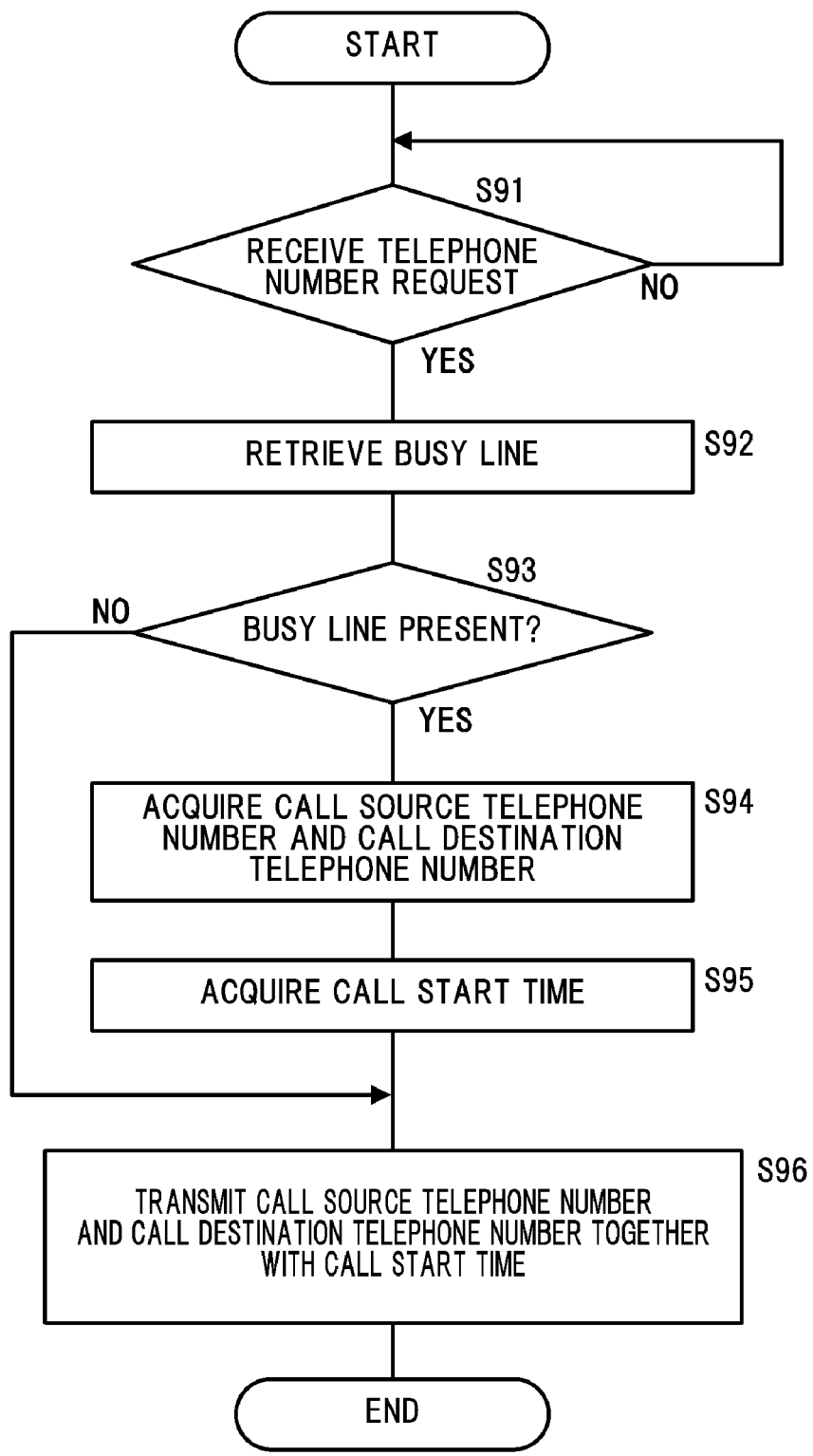
FIG. 22 is a flowchart illustrating a telephone number transmission process.

FIG. 22 is a flowchart of a telephone number transmission process. The CPU 200 in the telephone server 2 performs the telephone number transmission process in order to forward, to the forwarding apparatus 6, the telephone number called or in a busy state in response to a telephone number request transmitted from the forwarding apparatus 6. The CPU 200 determines whether a telephone number request has been received from the forwarding apparatus 6 (step S91). If it is determined in step S91 that no telephone number request has been received (no in step S91), the CPU 100 waits on standby for a reception of a telephone number request. If it is determined in step S91 that a telephone number request has been received (yes in step S91), the CPU 200 retrieves a busy line (step S92). The CPU 200 determines from retrieval results whether a busy line is present (step S93).

If it is determined in step S93 that a busy line is present (yes in step S93), the CPU 200 acquires the call source telephone number and the call destination telephone number (step S94). The CPU 200 acquires the call start time (step S95). At the call start time, the CPU 200 transmits, to the forwarding apparatus 1, the call source telephone number and the call destination telephone number (step S96). The telephone number transmission process thus ends. If it is determined in step S93 that a busy line is not present (no in step S93), the CPU 200 proceeds to step S96 to transmit the call destination telephone number.

In accordance with the second embodiment, if the forwarding apparatus 6 detects a file stored on the particular area of the file server 5 from the call source, the file is forwarded to the call destination. Even if the call destination in a busy state is unable to receive the mail, the mail may be received after the call. The forwarding apparatus 6 may forward the file from the communication source without temporarily storing the file.

The second embodiment has been discussed. The rest of the second embodiment remains unchanged from the first embodiment. The elements in the second embodiment identical to those in the first embodiment are designated with the same reference numerals and the detailed discussion thereof is omitted here.

Third Embodiment

In a third embodiment, a forwarding confirmation mail to confirm the forwarding of the mail is transmitted to the call source if the forwarding apparatus 1 forwards the mail. The responder 17 in the forwarding apparatus 1 transmits the forwarding confirmation mail to the call source when the mail forwarding unit 16 forwards the mail. The forwarding confirmation mail includes information related to the telephone number of the call destination and the forwarding destination such as a user name. If a forwarding conformation mail of the mail is returned from the transmission source, the responder 17 permits the mail to be forwarded. If the responder 17 permits the mail to be forwarded, the mail forwarding unit 16 forwards the mail to the forwarding destination address. The responder 17 thus functions as confirmation reception part receiving the forwarding confirmation from the transmission source.

FIG. 23 illustrates an example of the forwarding confirmation mail screen. Displayed on the screen are subject "forwarding confirmation" and a message stating a request requesting the confirmation of the forwarding of the mail. The message contains a telephone number "1111-0001" of the call source, a user name "staff member A," a telephone number "1111-0002" of the call destination, and a user name "staff member B." The subject of the mail to be forwarded, the name of an attached file, and the message are attached to the forwarding confirmation mail. A forwarding confirmation address including an authentication code "200902061018" is set for the transmission source address of the forwarding confirmation mail. The transmission source of the mail checks the forwarding destination and the mail content of the mail to be forwarded to prevent the mail from being forwarded to a wrong forwarding destination and to prevent the wrong content of the mail from being forwarded to the forwarding destination.

Figure 24:
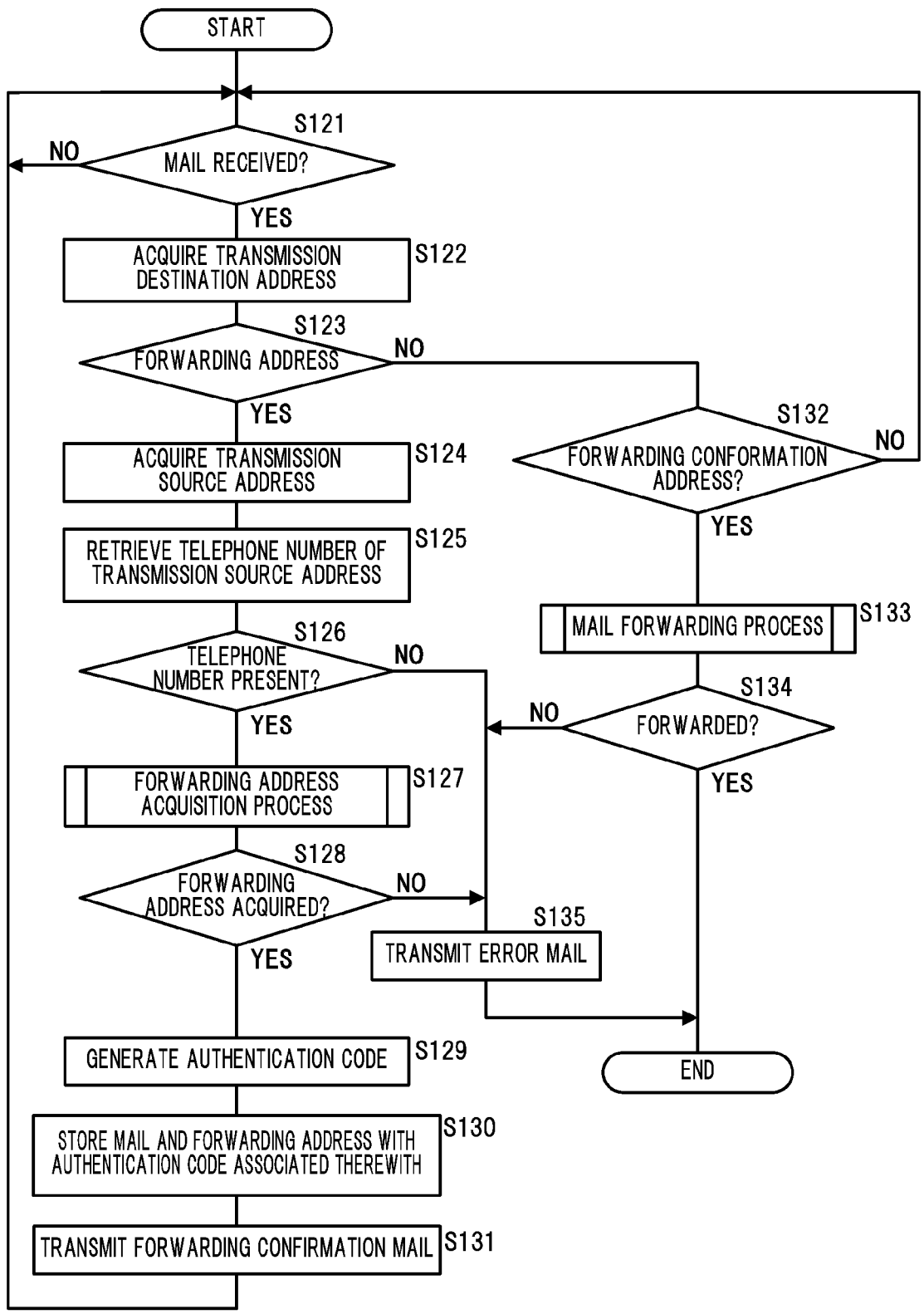
FIG. 24 is a flowchart illustrating a mail reception process.

FIG. 24 is a flowchart of a mail reception process. The CPU 100 in the forwarding apparatus 1 performs the mail reception process in order to receive the mail from the call source and to forward the mail to the forwarding address. The CPU 100 determines whether a mail has been received (step S121). If it is determined in step S121 that no mail has been received (no in step S121), the CPU 100 waits on standby for a reception of a mail. If it is determined in step S121 that a mail has been received (yes in step S121), the CPU 100 acquires a transmission destination address from the header of the mail (step S122). The CPU 100 determines whether the transmission destination address is a forwarding destination address (step S123).

If it is determined in step S123 that the transmission destination address is a forwarding destination address (yes in step S123), the CPU 100 acquires a transmission source address from the header of the mail (step S124). The CPU 100 retrieves, from the telephone number database 13, the telephone number corresponding to the transmission source address (step S125). The CPU 100 determines from retrieval results whether a telephone number is present (step S126). If it is determined in step S126 that a telephone number is present (yes in step S126), the CPU 100 executes the forwarding destination acquisition process (step S127). The CPU 100 determines whether a forwarding destination address has been acquired through the forwarding destination acquisition process (step S128).

If it is determined in step S128 that a forwarding destination address has been acquired through the forwarding destination acquisition process (yes in step S128), the CPU 100 generates an authentication code (step S129). The CPU 100 stores the mail and the forwarding destination address with the authentication code mapped thereto (step S130). The CPU 100 transmits a forwarding confirmation mail including the authentication code to the transmission source address (step S131) and returns to step S121 to determine whether a mail has been received. If it is determined in step S123 that the transmission destination address is not a forwarding destination address (no in step 123), the CPU 100 determines whether the transmission source address is a forwarding confirmation address (step S132). If it is determined in step S132 that the transmission source address is not a forwarding confirmation address (no in step S132), the CPU 100 returns to step S121 to determine whether a mail has been received.

If it is determined in step S132 that the transmission source address is a forwarding confirmation address (yes in step S132), the CPU 100 executes a mail forwarding process to be discussed later (step S133). The CPU 100 determines whether the mail forwarding process has been successfully completed and whether the mail has been successfully forwarded (step S134). If it is determined in step S134 that the mail has not been successfully forwarded (no in step S134), the CPU 100 transmits an error mail to the transmission source (step S135), and ends the mail reception process. If it is determined in step S134 that the mail has been successfully forwarded (yes in step S134), the CPU 100 ends the mail reception process. If it is determined in step S126 that a telephone number is not present (no in step S126), the CPU 100 proceeds to step S135 to transmit an error mail, and ends the mail reception process. If it is determined in step S128 that a forwarding destination address has not been acquired through the forwarding destination acquisition process (no in step S128), the CPU 100 proceeds to step S135 to transmit an error message, and ends the mail reception process.

Figure 25:
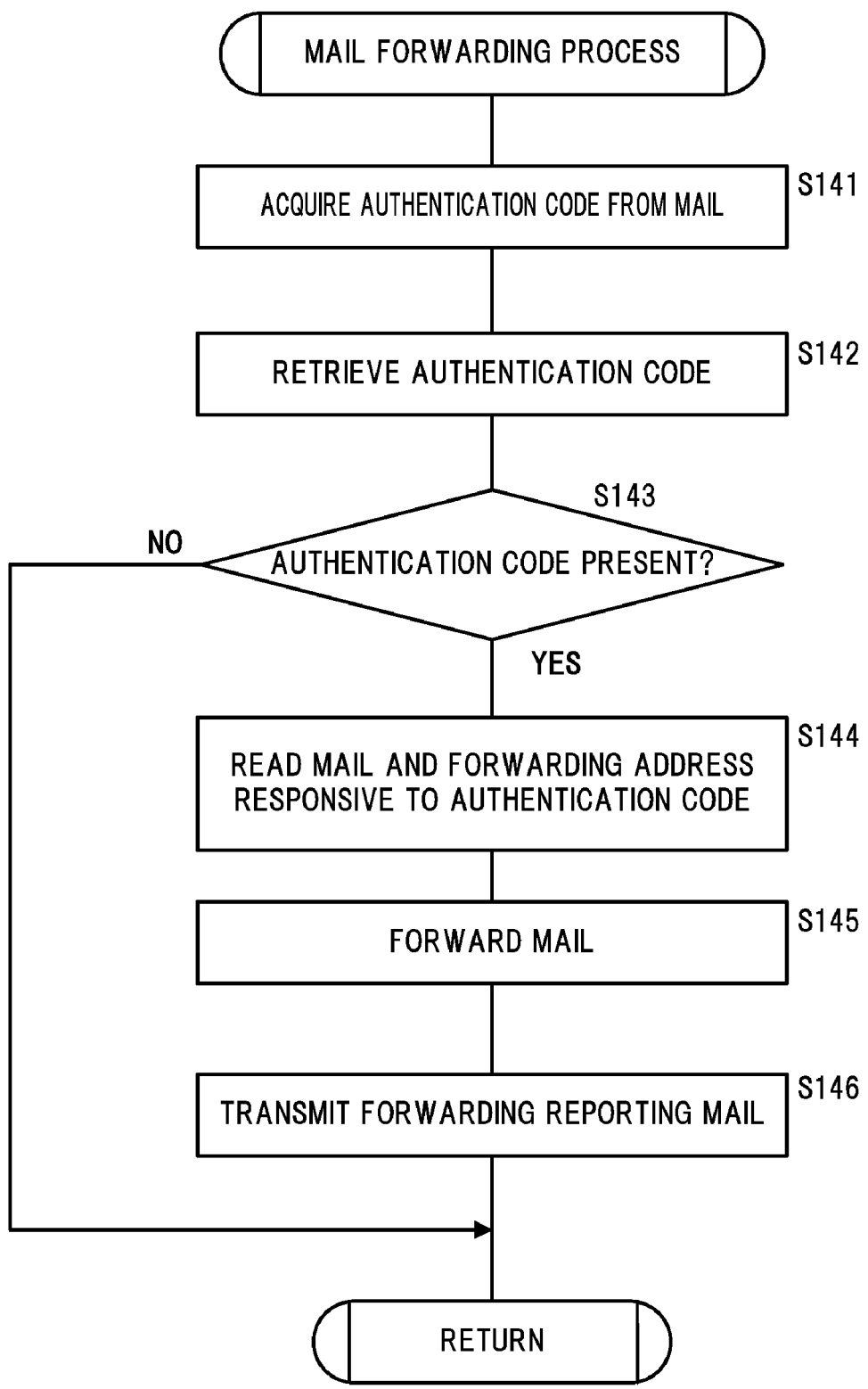
FIG. 25 is a flowchart illustrating a mail reception process.

FIG. 25 is a flowchart of the mail forwarding process. The mail forwarding process is performed in step S133 of the mail reception process of FIG. 24. The CPU 100 acquires an authentication code from the mail (step S141). The CPU 100 retrieves the acquired authentication code from among stored authentication codes (step S142). If it is determined in step S143 that the authentication code is present (yes in step S143), the CPU 100 reads the mail and the forwarding destination address stored in a mapped state with the authentication code (step S144). The CPU 100 forwards the read mail to the forwarding destination address (step S145). The CPU 100 transmits the forwarding reporting mail to the transmission source address (step S146). The CPU 100 ends the mail forwarding process. If it is determined in step S143 that the authentication code is not present (no in step S143), the CPU 100 ends the mail forwarding process.

In accordance with the third embodiment, the forwarding confirmation mail including the forwarding destination is transmitted to the mail transmission source if the forwarding destination is identified. Before the forwarding apparatus 1 forwards the mail, the transmission source of the mail may confirm that the forwarding destination matches the call destination. The third embodiment has been discussed. The rest of the third embodiment remains unchanged from the first and second embodiments. Elements and process names identical the counterparts in the first and second embodiments are designated with the same reference numerals and process names and the detailed discussion thereof is omitted here.

Fourth Embodiment

In accordance with a fourth embodiment, a mail is forwarded to a forwarding destination corresponding to a telephone number mapped to a call destination telephone number. A teleconference apparatus for allowing a plurality of participants to talk in a teleconference may be connected to the telephone network N1. If a call source participates in a teleconference using the telephone receiver 3, the call source communicates with the teleconference apparatus via the telephone network N1. The call destination telephone number called through the call source telephone number is not a telephone number of each participant of the teleconference, but a telephone number of the teleconference apparatus. If a call source forwards a mail to each participant, the telephone number of each participant is acquired through the telephone number of the teleconference apparatus.

Figure 26:
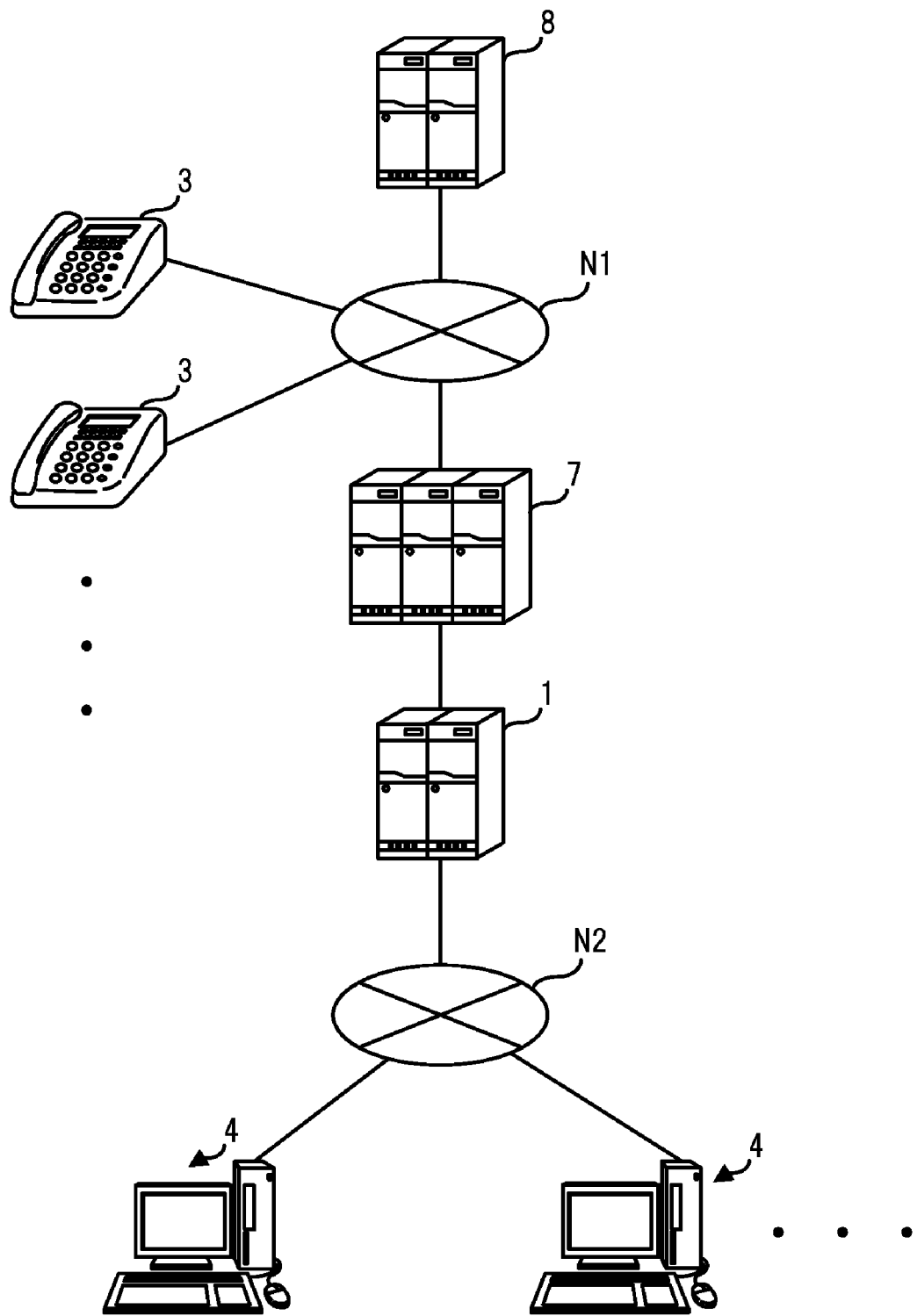
FIG. 26 illustrates an example of the forwarding system.

FIG. 26 illustrates a system configuration of a forwarding system of the fourth embodiment. The forwarding system includes servers 7 and a teleconference apparatus 8. The teleconference apparatus 8 provides a teleconference for a plurality of participants. The teleconference apparatus 8 is connected to the servers 7 via the telephone network N1. If the telephone number of the teleconference apparatus 8 is called using the telephone receiver 3 of the call source, the telephone receiver 3 may be linked to the teleconference apparatus 8 as the call destination via the telephone network N1. By calling the teleconference apparatus 8, the call source may participate in the teleconference provided by the teleconference apparatus 8.

Figure 27:
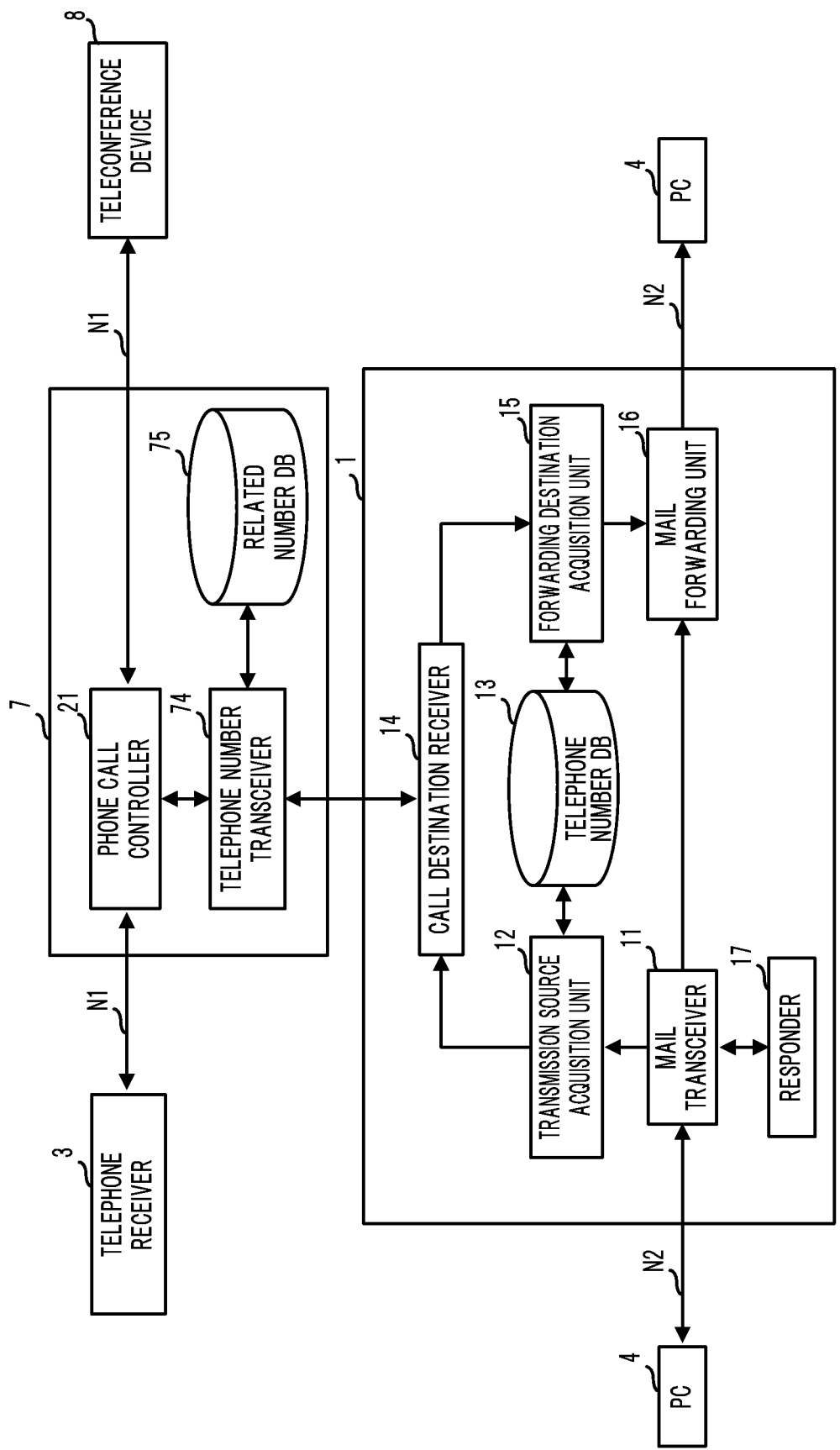
FIG. 27 is a functional block diagram of the forwarding system.

FIGS. 27 and 28 respectively illustrate a functional block diagram of the forwarding system and a record layout of a related number database 75. Referring to FIG. 27, the server 7 includes a telephone number transceiver 74 and a related number database 75. The related number database 75 as a storage part stores the telephone number of each participant related to the telephone number of the teleconference apparatus 8. If the call destination telephone number is a specific telephone number stored on the related number database 75, the telephone number transceiver 74 acquires, as the call destination telephone number, the telephone number related to the specific telephone number. A mail is thus forwarded to each talk participant. Referring to FIG. 28, a telephone number "1119-0009" of the teleconference apparatus 8 is stored on the related number database 75 with telephone numbers "1112-0002" and "1113-0003" of talk participants as related numbers mapped thereto.

Figure 29:
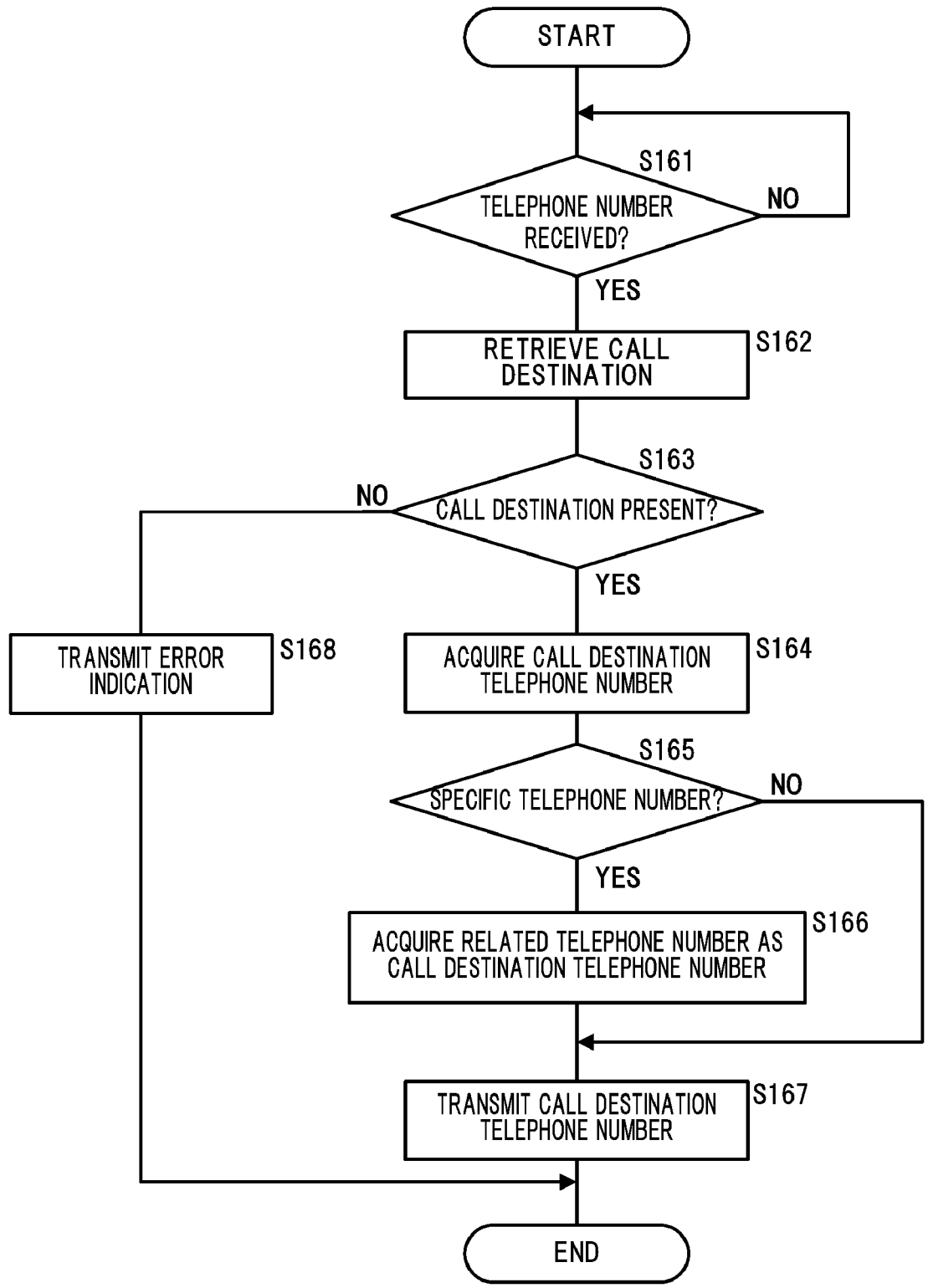
FIG. 29 is a flowchart of a telephone number transmission process.

FIG. 29 is a flowchart of a telephone number transmission process. The CPU 200 in the server 7 performs the telephone number transmission process to transmit a call destination telephone number in response to a transmission of a telephone number from the forwarding apparatus 1. The CPU 200 determines whether a telephone number has been received from the forwarding apparatus 1 (step S161). If it is determined in step S161 that no telephone number has been received (no in step S161), the CPU 200 waits on standby for a reception of a telephone number. If it is determined in step S161 that a telephone number has been received (yes in step S161), the CPU 200 retrieves a call destination having performed a calling operation using the telephone number (step S162).

The CPU 200 determines from retrieval results whether a call destination is present (step S163). If it is determined in step S163 that a call destination is present (yes in step S163), the CPU 200 acquires a call destination telephone number (step S164). The CPU 200 determines whether the call destination telephone number is a specific telephone number stored on the related number database 75 (step S165). If it is determined in step S165 that the call destination telephone number is a specific telephone number (yes in step S165), the CPU 200 acquires as the call destination telephone number a telephone number related to the specific telephone number (step S166).

The CPU 200 transmits the call destination telephone number to the forwarding apparatus 1 (step S167), and ends the telephone number transmission process. If it is determined in step S165 that the call destination telephone number is not a specific telephone number (no in step S165), the CPU 200 proceeds to step S167 to transmit the call destination telephone number. If it is determined in step S163 that a call destination is not present (no in step S163), the CPU 200 transmits an error indication to the forwarding apparatus 1 (step S168), and ends the telephone number transmission process.

The mail may thus be forwarded from the call source to each talk participant of the teleconference provided by the teleconference apparatus 8 of the call destination. In accordance with the fourth embodiment, the related number database 75 stores the telephone number of each talk participant of the teleconference and the mail is forwarded to each talk participant. The technique is not limited to this arrangement. For example, a mail may be forwarded to a specific call destination and a person related to the call destination. In such a case, the related number database 75 stores the telephone numbers of a plurality of related persons with the specific call destination telephone number mapped thereto. In this way, the mail may be forwarded from the call source to the call destination and the persons related to the call destination.

The fourth embodiment has been discussed. The rest of the fourth embodiment remains unchanged from the first through third embodiments. Elements and process names in the fourth embodiment identical to the counterparts in the first through third embodiments are designated with the same reference numerals and process names, and the discussion thereof is omitted here.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A forwarding apparatus communicating with a telephone server connected via a telephone line to a plurality of telephones, the forwarding apparatus comprising:
   a memory; and
   a processor coupled to the memory and programmed to execute a process including
      acquiring a first telephone number of a first telephone distinct from and corresponding to a transmission source of digital information;
      receiving, from the telephone server, a second telephone number of a second telephone called by the first telephone;
      identifying a forwarding destination corresponding to the second telephone number received from the telephone server;
      receiving a forwarding confirmation from the transmission source; and
      forwarding the digital information to the forwarding destination identified in the identifying if the forwarding confirmation is received.

2. The forwarding apparatus according to claim 1, further comprising:
   a storage storing a plurality of telephone numbers with a plurality of transmission sources and a plurality of forwarding destinations, respectively mapped to the plurality of telephone numbers,
   wherein the acquiring acquires the first telephone number corresponding to the transmission source of the digital information out of the plurality of telephone numbers stored in the storage, and
   wherein the identifying identifies the forwarding destination mapped to the second telephone number out of the plurality of forwarding destinations stored in the storage.

3. The forwarding apparatus according to claim 1, wherein the acquiring acquires a third telephone number included in the digital information.

4. The forwarding apparatus according to claim 1, wherein said processor is further programmed to notify the transmission source upon completion of the forwarding of the digital information.

5. The forwarding apparatus according to claim 1, wherein the digital information comprises an electronic mail, and
   wherein the identifying identifies a mail address of the forwarding destination.

6. A forwarding apparatus communicating with a telephone server connected via a telephone line to a plurality of telephones, the forwarding apparatus comprising:
   a memory; and
   a processor coupled to the memory and programmed to execute a process including
      receiving, from the telephone server, a call source telephone number and a call destination telephone number of each telephone having performed a calling operation;
      identifying a reception destination mapped to the call source telephone number received from the telephone server;
      identifying a forwarding destination mapped to the call destination telephone number received from the telephone server;
      receiving digital information from the reception destination;
      receiving a forwarding confirmation from the reception destination; and
      forwarding the digital information, received from the reception destination, to the forwarding destination if the forwarding confirmation is received.

7. The forwarding apparatus according to claim 6,
   wherein the digital information comprises an electronic mail,
   wherein the reception destination and the forwarding destination indicate particular areas of a storage unit of a file storage device,
   wherein the digital information is stored in a first particular area indicated by the reception destination, and
   wherein the electronic mail is forwarded to a second particular area indicated by the forwarding destination.

8. A telephone server communicating with a forwarding apparatus, the forwarding apparatus forwarding digital information received from a transmission source corresponding to one telephone to a forwarding destination corresponding to another telephone, the telephone server comprising:
   a memory; and
   a processor coupled to the memory and programmed to execute a process including
      receiving, from the forwarding apparatus, a first telephone number of a first telephone as the transmission source;
      acquiring a second telephone number of a second telephone using the first telephone number;
      receiving a forwarding confirmation from the transmission source; and
      transmitting, to the forwarding apparatus, the second telephone number to notify the forwarding apparatus of the second telephone number corresponding to the forwarding destination, enabling the digital information to be forwarded to the forwarding destination if the forwarding confirmation is received.

9. The telephone server according to claim 8, further comprising:
   a storage storing a plurality of telephone numbers with particular telephone numbers respectively mapped thereto,
   wherein the acquiring acquires the second telephone number stored with a particular telephone mapped thereto if the first telephone number is the particular telephone number stored in the storage.

10. A forwarding method of forwarding digital information, the method comprising:

acquiring a first telephone number of a first telephone distinct from and corresponding to a transmission source of digital information;

acquiring a second telephone number of a call destination called by the first telephone;

identifying a forwarding destination corresponding to second telephone having the second telephone number of the call destination;

receiving a forwarding confirmation from the transmission source; and forwarding the digital information to the forwarding destination if the forwarding confirmation is received.

11. A non-transitory computer readable medium embodying a forwarding program for a forwarding apparatus communicating with a telephone server connected via a telephone line to a plurality of telephones, the forwarding program when executed by a processor causing the processor to perform a method comprising:

acquiring a first telephone number of a first telephone according to a transmission source of digital information distinct from the first telephone;

receiving, from the telephone server, a second telephone number of a second telephone called by the first telephone;

identifying a forwarding destination corresponding to the second telephone;

receiving a forwarding confirmation from the transmission source; and forwarding the digital information to the forwarding destination if the forwarding confirmation is received.

12. A non-transitory computer readable medium embodying a transmission program for a telephone server communicating with a forwarding apparatus forwarding digital information, the transmission program when executed by a processor causing the processor to perform a method comprising:

receiving, from the forwarding apparatus, a first telephone number of a first telephone distinct from and corresponding to a transmission source of digital information;

acquiring a second telephone number of a second telephone called by the first telephone;

receiving a forwarding confirmation from the transmission source; and transmitting to the forwarding apparatus the second telephone number to notify the forwarding apparatus of the second telephone number corresponding to the forwarding destination, enabling the digital information to be forwarded to the forwarding destination if the forwarding confirmation is received.

13. A forwarding system comprising a telephone server connected to a plurality of telephones via a telephone line and managing a call between the plurality of telephones, and a forwarding apparatus communicating with the telephone server, the forwarding apparatus including a first processor programmed to perform a method of acquiring a first telephone number of a first telephone according to a transmission source of digital information distinct from the first telephone; and transmitting, to the telephone server, the first telephone number, the telephone server including a second processor programmed to perform a method of receiving the first telephone number transmitted from the transmission source;

acquiring a second telephone number of a second telephone called by the telephone corresponding to the first telephone number; and transmitting, to the forwarding apparatus, the second telephone number; and the method performed by the first processor in the forwarding apparatus further including receiving the second telephone number transmitted by the telephone server;

identifying a forwarding destination corresponding to the second telephone having the second telephone number;

receiving a forwarding confirmation from the transmission source; and forwarding the digital information to the forwarding destination if the forwarding confirmation is received.

* * * * *